(12) United States Patent
Dustin et al.

(10) Patent No.: US 11,692,109 B2
(45) Date of Patent: *Jul. 4, 2023

(54) MULTIPHASE COATINGS WITH SEPARATED FUNCTIONAL PARTICLES, AND METHODS OF MAKING AND USING THE SAME

(71) Applicant: HRL Laboratories, LLC, Malibu, CA (US)

(72) Inventors: Ashley M. Dustin, Los Angeles, CA (US); Andrew P. Nowak, Los Angeles, CA (US); Jason A. Graetz, Calabasas, CA (US); John J. Vajo, West Hills, CA (US); April R. Rodriguez, Santa Monica, CA (US)

(73) Assignee: HRL Laboratories, LLC, Malibu, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/564,903

(22) Filed: Dec. 29, 2021

(65) Prior Publication Data

US 2022/0119673 A1    Apr. 21, 2022

Related U.S. Application Data

(60) Continuation of application No. 16/876,075, filed on May 17, 2020, now Pat. No. 11,225,589, which is a (Continued)

(51) Int. Cl.
*C09D 171/02* (2006.01)
*C08G 65/00* (2006.01)
(Continued)

(52) U.S. Cl.
CPC ......... *C09D 171/02* (2013.01); *C08G 65/007* (2013.01); *C08G 65/226* (2013.01);
(Continued)

(58) Field of Classification Search
CPC .. C09D 171/02; C09D 201/02; C09D 175/08; C08G 65/007; C08G 65/226;
(Continued)

(56) References Cited

U.S. PATENT DOCUMENTS

| 5,332,798 A | 7/1994 | Ferreri et al. |
| 2015/0308044 A1 | 10/2015 | Delmas et al. |
| 2016/0194574 A1 | 7/2016 | Gross et al. |

FOREIGN PATENT DOCUMENTS

| CN | 105255338 A | 1/2016 |
| WO | 2015102699 A2 | 7/2015 |

OTHER PUBLICATIONS

Siao-Wei Yeh et al. "Morphological Transformation of PS-b-PEO diblock copolymer by selectively dispersed colloidal CdS quantum dots", Macromolecules, 2003, 36, 7903 (Year: 2003).*

(Continued)

*Primary Examiner* — Andrew J. Oyer
(74) *Attorney, Agent, or Firm* — O'Connor & Company; Ryan P. O'Connor

(57) ABSTRACT

Some variations provide a multiphase polymer composition comprising a first polymer material and a second polymer material that are chemically distinct, wherein the first polymer material and the second polymer material are microphase-separated on a microphase-separation length scale from about 0.1 microns to about 500 microns, wherein the multiphase polymer composition comprises first solid functional particles selectively dispersed within the first polymer material, and wherein the first solid functional particles are chemically distinct from the first polymer material and the second polymer material. Some embodiments provide an anti-corrosion composition comprising first corrosion-inhibitor particles or precursors selectively dispersed within the first polymer material, wherein the multiphase polymer composition optionally further comprises second corrosion- (Continued)

inhibitor particles or precursors selectively dispersed within the second polymer material. These multiphase polymer compositions may be used for other applications, such as self-cleaning, self-healing, or flame-retardant coatings. Methods of making and using these multiphase polymer compositions are disclosed.

18 Claims, 8 Drawing Sheets
(2 of 8 Drawing Sheet(s) Filed in Color)

Related U.S. Application Data division of application No. 15/957,638, filed on Apr. 19, 2018, now Pat. No. 10,689,542.

(60) Provisional application No. 62/634,990, filed on Feb. 26, 2018, provisional application No. 62/607,402, filed on Dec. 19, 2017, provisional application No. 62/543,590, filed on Aug. 10, 2017.

(51) Int. Cl.
| | | |
|---|---|---|
| *C08L 101/02* | (2006.01) | |
| *C09D 201/02* | (2006.01) | |
| *C08G 65/22* | (2006.01) | |
| *C08G 81/00* | (2006.01) | |

(52) U.S. Cl.
CPC .......... *C08G 81/00* (2013.01); *C08L 101/02* (2013.01); *C09D 201/02* (2013.01); *C08G 2650/22* (2013.01); *C08G 2650/48* (2013.01); *C08G 2650/58* (2013.01)

(58) Field of Classification Search
CPC .......... C08G 81/00; C08G 2650/22; C08G 2650/48; C08G 2650/58; C08G 2150/90; C08G 18/10; C08G 18/12; C08G 18/246; C08G 18/4833; C08G 18/4854; C08G 18/5015; C08G 18/758; C08L 101/02; C08K 3/11; C08K 3/16; C08K 2003/387; C08K 2201/005
See application file for complete search history.

(56) References Cited

OTHER PUBLICATIONS

Cai et al., "Corrosion Behavior of Titania Films Coated by Liquid-Phase Deposition on AlSI304 Stainless Steel Substrates" AlChE Journal Jun. 2012 vol. 58, No. 6 1907-1920.
Castellano et al., "Fluoro-modified elastomeric polyurethanes: effects of synthesis procedure on properties and morphology" J Mater Sci (2014) 49:2519-2533.
Guin et al., "Development and Performance Evaluation of Corrosion Resistance Self-Healing Coating" ISRN Corrosion vol. 2014, Article ID 979323, 7 pages, Published Apr. 23, 2014.
Presuel-Moreno et al., "Corrosion-resistant metallic coatings" Materials Today, Oct. 2008, vol. 11, No. 10, pp. 14-23.
Popoola et al., "Corrosion Resistance Through the Application of Anti-Corrosion Coatings" Chapter 12 in Developments in Corrosion Protection, Published: Feb. 20, 2014, IntechOpen.

\* cited by examiner

611

601

MULTIPHASE COATINGS WITH SEPARATED FUNCTIONAL PARTICLES, AND METHODS OF MAKING AND USING THE SAME

PRIORITY DATA

This patent application is a continuation application of U.S. Pat. No. 11,225,589, issued on Jan. 18, 2022, which is a divisional of U.S. Pat. No. 10,689,542, issued on Jun. 23, 2020, which in turn claims priority to (a) U.S. Provisional Patent App. No. 62/543,590, filed on Aug. 10, 2017; (b) U.S. Provisional Patent App. No. 62/607,402, filed on Dec. 19, 2017; and (c) U.S. Provisional Patent App. No. 62/634,990, filed on Feb. 26, 2018, each of which is hereby incorporated by reference herein.

FIELD OF THE INVENTION

The present invention generally relates to multiphase coatings and methods of making multiphase coatings.

BACKGROUND OF THE INVENTION

A coating is a covering that is applied to the surface of an object, usually referred to as the substrate. The purpose of applying the coating may be decorative, functional, or both. Practically every manufactured product requires a coating, often for protective purposes. A major use of coatings is to prevent or counteract the effects of corrosion.

Corrosion is a naturally occurring process that causes significant changes to the physical structure of a material, usually a metal. These changes can be caused by a chemical reaction when metals are exposed to water, acids, or gases. Corrosion weakens the physical structure of the material and can eventually lead to failure of the affected component. By the time corrosion is visible, the damage can be very costly to repair. National Association of Corrosion Engineers (NACE) estimates that the direct costs for preventing, mitigating, and repairing corrosion in the United States are $276 billion annually, and indirect costs such as lost productivity, litigation, and environmental mitigation may push the total corrosion bill to more than $550 billion (Lalgudi et al., "The Science of Corrosion-Busting Smart Coatings", *Paint & Coatings Industry*, Mar. 1, 2016).

Generally, various particles can be introduced into coatings. However, commercial coatings include only one reactive particle, or multiple unreactive particles, because of processing limitations. There are no known methods to keep reactive species from interacting during the synthesis. Many coatings are synthesized in a single reaction vessel with sequential additions of the various components. Even if the resulting coating displays a desired phase-separated morphology, the components themselves are in contact prior to phase separation. This common procedure does not allow for two different reactive particles to be segregated into a certain phase.

There is a need for a new capability to fabricate multifunctional coatings with reactive particles that cannot normally be mixed or associated with one another. In view of the shortcomings in the art, improved coating materials and systems, and compositions suitable for these systems, are needed, especially to maintain the mechanical integrity of the coating for corrosion resistance and other applications. In particular, what is desired commercially is an entirely new platform, enabling the fabrication of coatings and materials with multiple functional additives, in an industrially scalable process.

SUMMARY OF THE INVENTION

The present invention addresses the aforementioned needs in the art, as will now be summarized and then further described in detail below.

Some variations provide a multiphase polymer composition comprising a first polymer material and a second polymer material that are chemically distinct, wherein the first polymer material and the second polymer material are microphase-separated on a microphase-separation length scale from about 0.1 microns to about 500 microns, wherein the multiphase polymer composition comprises first solid functional particles selectively dispersed within the first polymer material, and wherein the first solid functional particles are chemically distinct from the first polymer material and the second polymer material.

In some embodiments, the first solid functional particles are capable of reacting with the second polymer material, in response to an environmental input selected from the group consisting of ultraviolet light, change in temperature, change in pressure, environmental solvents, change in humidity, change in pH, and combinations thereof.

In some embodiments, the multiphase polymer composition is disposed on a surface, and the first solid functional particles are capable of reacting with the surface, in response to an environmental input selected from the group consisting of ultraviolet light, change in temperature, change in pressure, environmental solvents, change in humidity, change in pH, and combinations thereof.

The first solid functional particles may be dissolvable in water or an aqueous solvent. Alternatively, or additionally, the first solid functional particles may be dissolvable in an organic solvent. Any of these solvents may be environmental solvents, i.e. fluids derived from the local environment, such as rain, ocean spray, melted snow or ice, humidity, fuel, cleaning fluid, hydraulic fluid, or anti-icing fluid.

In some variations, the multiphase polymer composition further comprises second solid functional particles selectively dispersed within the second polymer material, wherein the second solid functional particles are chemically distinct from the first polymer material and the second polymer material. In certain embodiments, the second solid functional particles are essentially not contained at all within the first polymer material.

When second solid functional particles are present, the first solid functional particles and the second solid functional particles may be capable of reacting with each other in response to an environmental input selected from the group consisting of ultraviolet light, change in temperature, change in pressure, environmental solvents, change in humidity, change in pH, and combinations thereof.

When second solid functional particles are present, they may be capable of reacting with the first polymer material, in response to an environmental input selected from the group consisting of ultraviolet light, change in temperature, change in pressure, environmental solvents, change in humidity, change in pH, and combinations thereof.

In some embodiments, the multiphase polymer composition is disposed on a surface, and the second solid functional particles are included and capable of reacting with the surface, in response to an environmental input selected from the group consisting of ultraviolet light, change in temperature, change in pressure, environmental solvents, change in humidity, change in pH, and combinations thereof.

The second solid functional particles may be dissolvable in water or an aqueous solvent. Alternatively, or additionally, the second solid functional particles may be dissolvable in an organic solvent. Any of these solvents may be environmental solvents, i.e. fluids derived from the local environment, such as rain, ocean spray, melted snow or ice, humidity, fuel, cleaning fluid, hydraulic fluid, or anti-icing fluid.

The first solid functional particles may include inorganic particles, organic particles, or a combination thereof. The second solid functional particles, when present, may include inorganic particles, organic particles, or a combination thereof.

The first solid functional particles may include oxidizing agents, reducing agents, or a combination thereof. The second solid functional particles, when present, may include oxidizing agents, reducing agents, or a combination thereof.

The first solid functional particles may be selected from the group consisting of metals, metal oxides, organic oxides, ceramics, salts, polymers, and combinations thereof. The second solid functional particles, when present, may be selected from the group consisting of metals, metal oxides, organic oxides, ceramics, salts, polymers, and combinations thereof.

The first solid functional particles may be surface-treated to enhance chemical compatibility with the first polymer material. The second solid functional particles, when present, may be surface-treated to enhance chemical compatibility with the second polymer material. Surface treatment may adjust properties such as hydrophobicity, hydrophilicity, surface tension, polarity, and solubility.

The first solid functional particles may have an average particle size from about 50 nanometers to about 500 microns, for example. The second solid functional particles, when present, may have an average particle size from about 50 nanometers to about 500 microns, for example.

In various embodiments, the first polymer material and the second polymer material are independently selected from the group consisting of polyesters, polyethers, polyacrylates, polymethacrylates, polyepoxides, polysiloxanes, cellulosic polymers, and combinations thereof.

Polyesters and polyethers may be selected from the group consisting of perfluoropolyethers, polyfluoroacrylates, polyfluorosiloxanes, polyvinylidene fluoride, polytrifluoroethylene, poly(oxymethylene), poly(ethylene glycol), poly(propylene oxide), poly(tetrahydrofuran), poly(glycolic acid), poly(caprolactone), poly(ethylene adipate), poly(hydroxyl butyrate), poly(hydroxyl alkanoate), and combinations thereof.

Polyacrylates, polymethacrylates, polyepoxides, polysiloxanes, and cellulosic polymers may be selected from the group consisting of polymethylmethacrylate, poly(acrylic acid), poly(2-hydroxyethyl methacrylate), poly(vinyl imidazole), poly(2-methyl-2-oxazoline), poly(2-ethyl-2-oxazoline), poly(vinylpyrolidone), polydimethylsiloxane, cellulose, cellulose hydrogels, methyl cellulose, carboxymethyl cellulose, hydroxyethyl cellulose, hydroxypropyl cellulose, and combinations thereof.

In some embodiments, one of the first polymer material or the second polymer material is a continuous matrix, and the other of the first polymer material or the second polymer material is a plurality of inclusions, dispersed within the continuous matrix. Either the continuous matrix or the inclusions may be the first polymer material containing the first solid functional particles, and the continuous matrix or inclusions that do not contain the first solid functional particles optionally contain second solid functional particles.

The continuous matrix and the inclusions may be covalently bonded with each other, directly or via reactive species contained within and/or between the continuous matrix and the inclusions. In some embodiments, the reactive species include an isocyanate species and an alcohol or amine with functionality of 2 or greater. An isocyanate species may be selected from the group consisting of 4,4'-methylenebis(cyclohexyl isocyanate), hexamethylene diisocyanate, cycloalkyl-based diisocyanates, tolylene-2,4-diisocyanate, 4,4'-methylenebis(phenyl isocyanate), isophorone diisocyanate, and combinations or derivatives thereof. In these or other embodiments, the reactive species includes an epoxy and an alcohol, amine, or thiol with functionality of 2 or greater.

In some embodiments, the continuous matrix and the inclusions are covalently bonded with each other via reactive species, in a segmented block copolymer containing first soft segments and second soft segments, wherein one of the continuous matrix or the inclusions contain the first soft segments, and wherein the other of the continuous matrix or the inclusions contain the second soft segments.

Generally, the multiphase polymer composition contains a segmented block copolymer, wherein the first polymer material contains or consists essentially of first soft segments of the segmented block copolymer, and wherein the second polymer material contains or consists essentially of second soft segments of the segmented block copolymer.

In certain embodiments, the segmented copolymer composition comprises:

(a) one or more the first soft segments selected from fluoropolymers having an average molecular weight from about 500 g/mol to about 10,000 g/mol, wherein the fluoropolymers are $(\alpha,\omega)$-hydroxyl-terminated and/or $(\alpha,\omega)$-amine-terminated;

(b) one or more the second soft segments selected from polyesters or polyethers, wherein the polyesters or polyethers are $(\alpha,\omega)$-hydroxyl-terminated and/or $(\alpha,\omega)$-amine-terminated, wherein the molar ratio of the second soft segments to the first soft segments is optionally less than 2.0;

(c) one or more isocyanate species, or a reacted form thereof, possessing an isocyanate functionality of 2 or greater; and (d) one or more polyol or polyamine chain extenders or crosslinkers, or a reacted form thereof.

The fluoropolymer may be selected from the group consisting of polyfluoroethers, perfluoropolyethers, polyfluoroacrylates, polyfluorosiloxanes, polytetrafluoroethylene, polyvinylidene difluoride, polyvinylfluoride, polychlorotrifluoroethylene, copolymers of ethylene and trifluoroethylene, copolymers of ethylene and chlorotrifluoroethylene, and combinations thereof.

The fluoropolymers may be present in the triblock structure:

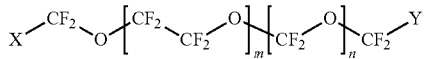

wherein:
X, Y=$CH_2$—(O—$CH_2$—$CH_2$)$_p$-T, and X and Y are independently selected;
p=1 to 50;
T is a hydroxyl or amine terminal group;
m=1 to 100; and
n=0 to 100.

The isocyanate species may be selected from the group consisting of 4,4'-methylenebis(cyclohexyl isocyanate), hexamethylene diisocyanate, cycloalkyl-based diisocyanates, tolylene-2,4-diisocyanate, 4,4'-methylenebis(phenyl isocyanate), isophorone diisocyanate, and combinations or derivatives thereof.

The polyol or polyamine chain extenders or crosslinkers may be selected from the group consisting of 1,3-butanediol, 1,4-butanediol, 1,3-propanediol, 1,2-ethanediol, diethylene glycol, triethylene glycol, tetraethylene glycol, propylene glycol, dipropylene glycol, tripropylene glycol, neopentyl glycol, 1,6-hexanediol, 1,4-cyclohexanedimethanol, ethanol amine, diethanol amine, methyldiethanolamine, phenyldiethanolamine, glycerol, trimethylolpropane, 1,2,6-hexanetriol, triethanolamine, pentaerythritol, ethylenediamine, 1,3-propanediamine, 1,4-butanediamine, diethyltoluenediamine, dimethylthiotoluenediamine, isophoronediamine, diaminocyclohexane, N,N,N',N'-tetrakis (2-hydroxypropyl) ethylenediamine, and homologues, derivatives, or combinations thereof. In certain embodiments, the polyol or polyamine chain extenders or crosslinkers possess an average functionality of about 3 or greater.

Optionally, the multiphase polymer composition may further include one or more additional components selected from the group consisting of a particulate filler, a pigment, a dye, a plasticizer, a flame retardant, and combinations thereof. The particulate filler may be selected from the group consisting of silica, alumina, silicates, talc, aluminosilicates, barium sulfate, mica, diatomite, calcium carbonate, calcium sulfate, carbon, wollastonite, and combinations thereof.

The multiphase polymer composition may be present in or as a coating, such as (but not limited to) an anti-corrosion coating applied to a metallic substrate.

Some variations of the invention provide an anti-corrosion composition comprising a first polymer material and a second polymer material that are chemically distinct, wherein the first polymer material and the second polymer material are microphase-separated on a microphase-separation length scale from about 0.1 microns to about 500 microns, wherein the multiphase polymer composition comprises first corrosion-inhibitor particles or precursors selectively dispersed within the first polymer material, wherein the multiphase polymer composition optionally further comprises second corrosion-inhibitor particles or precursors selectively dispersed within the second polymer material, and wherein the first corrosion-inhibitor particles or precursors and the second corrosion-inhibitor particles or precursors are chemically distinct from the first polymer material and the second polymer material.

In some embodiments, the first corrosion-inhibitor particles or precursors and/or the second corrosion-inhibitor particles or precursors (when present) are selected from the group consisting of redox reaction-type inhibitors, hydrolysis reaction-type inhibitors, anodic polarization-type inhibitors, adsorbate-type inhibitors, and combinations thereof.

In some embodiments employing the second corrosion-inhibitor particles or precursors, the first corrosion-inhibitor particles or precursors and the second corrosion-inhibitor particles or precursors are capable of reacting with each other in response to an environmental input selected from the group consisting of ultraviolet light, change in temperature, change in pressure, environmental solvents, change in humidity, change in pH, and combinations thereof.

In some embodiments employing the second corrosion-inhibitor particles or precursors, the anti-corrosion composition is disposed on a metal-containing substrate, wherein the first corrosion-inhibitor particles or precursors and the second corrosion-inhibitor particles or precursors are capable of reacting with each other to form a passivation coating or anti-corrosion layer on the metal-containing substrate. An anti-corrosion layer reduces the corrosion potential of the underlying metal-containing substrate.

In certain exemplary embodiments, the first corrosion-inhibitor particles or precursors include ammonium hexafluorotitanate and/or chromium(III) oxide, and the second corrosion-inhibitor particles or precursors include boric acid and/or potassium permanganate.

Variations of the invention also provide a method of making a multiphase polymer composition, the method comprising:

(a) in a first reaction container, synthesizing a first polymer material from first-polymer starting components;

(b) in a second reaction container, synthesizing a second polymer material from second-polymer starting components, wherein the second polymer material is chemically distinct from the first polymer material;

(c) introducing a plurality of first solid functional particles into the first reaction container, to dispose the first solid functional particles in the first polymer material, wherein the first solid functional particles are chemically distinct from the first polymer material and the second polymer material;

(d) optionally introducing a plurality of second solid functional particles into the second reaction container, to disperse the second solid functional particles in the second polymer material;

(e) providing reactive species capable of covalently bonding the first polymer material with the second polymer material; and (f) combining the first polymer material, the second polymer material, and the reactive species to covalently bond the first polymer material with the second polymer material, thereby generating a multiphase polymer composition, wherein the multiphase polymer composition comprises the first solid functional particles selectively dispersed within the first polymer material, and wherein the first polymer material and the second polymer material are microphase-separated on a microphase-separation length scale from about 0.1 microns to about 500 microns.

When (d) is performed, the multiphase polymer composition comprises the second solid functional particles selectively dispersed within the second polymer material.

The multiphase polymer composition may be present in or as a coating. In some method embodiments, the first solid functional particles react in response to damage to the coating. The reaction can be with other first solid functional particles, with the second solid functional particles (when present), with a surface, with a fluid, or any combination thereof.

In some method embodiments, the first solid functional particles react upon exposure to ultraviolet light, a change in temperature, a change in pH, a change in pressure, or a combination thereof. In some embodiments, the second solid functional particles also react upon exposure to ultraviolet light, a change in temperature, a change in pH, a change in pressure, or a combination thereof.

The first solid functional particles, the second solid functional particles, or both of these may be dissolved in aqueous or organic solvent that originates from the environment. For example, an aqueous or organic solvent may be selected from the group consisting of atmospheric humidity, rain, ocean spray, melted snow or ice, fuel, cleaning fluid, hydraulic fluid, anti-icing fluid, and combinations thereof.

In some methods, the coating is an anti-corrosion coating applied to a metallic substrate, wherein the first solid functional particles include first corrosion-inhibitor particles or precursors. The first solid functional particles may react with the metallic substrate to form a passivation coating or an anti-corrosion layer. The first solid functional particles may react with an aqueous or organic fluid that originates from the environment, such as atmospheric humidity, rain, ocean spray, fuel, cleaning fluid, hydraulic fluid, or anti-icing fluid, for example.

In some methods in which step (d) is performed and when the multiphase polymer composition is present in or as an anti-corrosion coating applied to a metallic substrate, the second solid functional particles include second corrosion-inhibitor particles or precursors. In these embodiments, the first solid functional particles and the second solid functional particles may react with each other to form a passivation coating or an anti-corrosion layer. In some embodiments, the first solid functional particles and the second solid functional particles react with each other and the metallic substrate to form a passivation coating or an anti-corrosion layer. In certain embodiments, the first solid functional particles and the second solid functional particles react with each other, the metallic substrate, and an aqueous or organic fluid that originates from the environment, to form a passivation coating or an anti-corrosion layer.

BRIEF DESCRIPTION OF THE DRAWINGS

The patent or application file contains at least one drawing executed in color. Copies of this patent or patent application publication with color drawings will be provided by the Office upon request and payment of the necessary fee.

DETAILED DESCRIPTION OF EMBODIMENTS OF THE INVENTION

Figure 1:
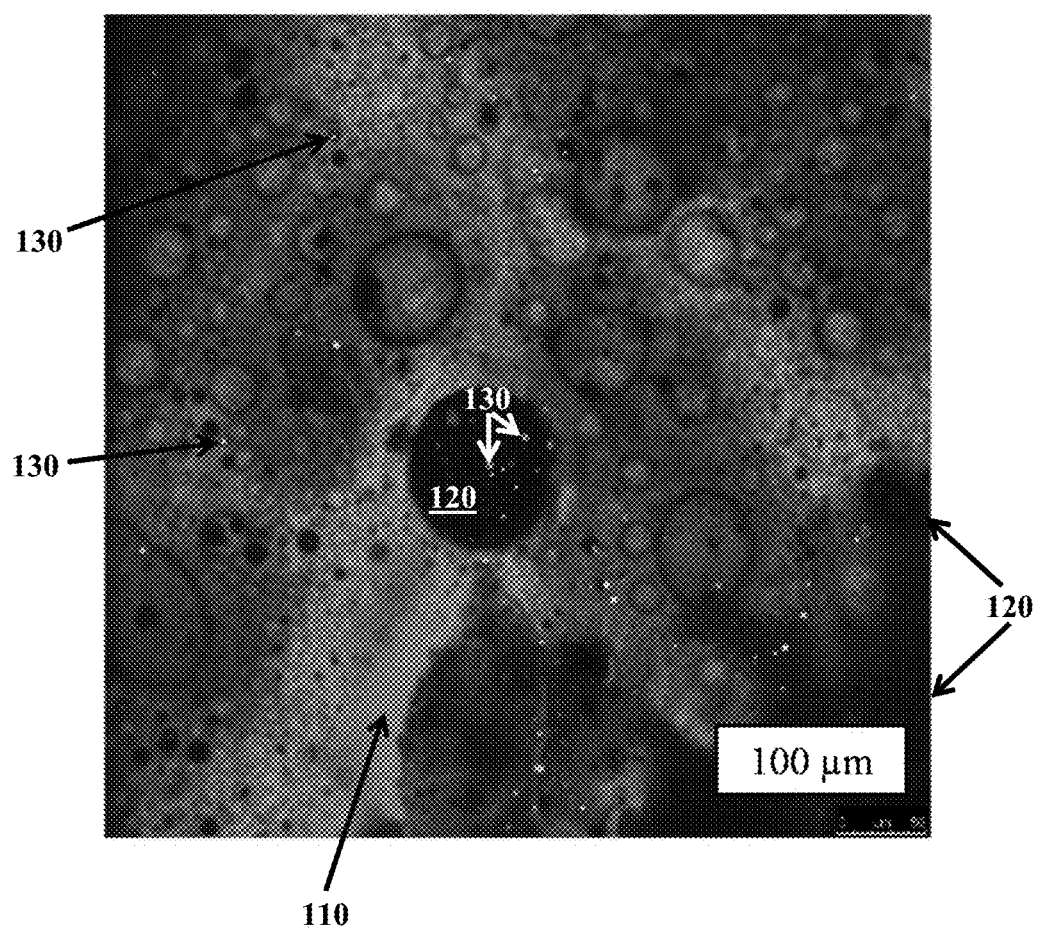
FIG. 1 is an exemplary image from confocal laser scanning microscopy depicting phase inhomogeneity and dispersed solid particles, from Example 6.

The materials, compositions, structures, systems, and methods of the present invention will be described in detail by reference to various non-limiting embodiments.

This description will enable one skilled in the art to make and use the invention, and it describes several embodiments, adaptations, variations, alternatives, and uses of the invention. These and other embodiments, features, and advantages of the present invention will become more apparent to those skilled in the art when taken with reference to the following detailed description of the invention in conjunction with the accompanying drawings.

As used in this specification and the appended claims, the singular forms "a," "an," and "the" include plural referents unless the context clearly indicates otherwise. Unless defined otherwise, all technical and scientific terms used herein have the same meaning as is commonly understood by one of ordinary skill in the art to which this invention belongs.

Unless otherwise indicated, all numbers expressing conditions, concentrations, dimensions, and so forth used in the specification and claims are to be understood as being modified in all instances by the term "about." Accordingly, unless indicated to the contrary, the numerical parameters set forth in the following specification and attached claims are approximations that may vary depending at least upon a specific analytical technique.

The term "comprising," which is synonymous with "including," "containing," or "characterized by" is inclusive or open-ended and does not exclude additional, unrecited elements or method steps. "Comprising" is a term of art used in claim language which means that the named claim elements are essential, but other claim elements may be added and still form a construct within the scope of the claim.

As used herein, the phrase "consisting of" excludes any element, step, or ingredient not specified in the claim. When the phrase "consists of" (or variations thereof) appears in a clause of the body of a claim, rather than immediately following the preamble, it limits only the element set forth in that clause; other elements are not excluded from the claim as a whole. As used herein, the phrase "consisting essentially of" limits the scope of a claim to the specified elements or method steps, plus those that do not materially affect the basis and novel characteristic(s) of the claimed subject matter.

With respect to the terms "comprising," "consisting of," and "consisting essentially of," where one of these three terms is used herein, the presently disclosed and claimed subject matter may include the use of either of the other two terms, except when used in Markush groups. Thus in some embodiments not otherwise explicitly recited, any instance of "comprising" may be replaced by "consisting of" or, alternatively, by "consisting essentially of."

This invention is predicated, at least in part, on the fabrication of materials and coatings with solid functional particles. In particular, variations of this invention provide a synthesis strategy that enables the incorporation and segregation of functional particles into microphase-separated domains. This disclosure describes a new capability to fabricate multifunctional coatings with particles that usually cannot be mixed or associated with each other, due to reactivity. By contrast, materials disclosed herein allow such particles to be contained in a coating, because particle segregation may be maintained until an external trigger is applied.

In particular, incompatible or reactive particles may be segregated within the different phases of a coating, allowing for a latent, triggerable reaction. This technology enables the combination of multiple dissimilar particles in a single coating, which is not achievable with traditional synthesis techniques. The single coating has multiple phases in a microphase-separated network, wherein particles are disposed selectively within those phases.

The materials described herein may be derived from specialty high-end precursors or from cost-effective, commercially available materials. The multiphase materials provided herein have many commercial applications, including but not limited to anti-corrosion, self-cleaning, self-healing, and flame-retardant coatings and materials.

For example, corrosion-resistant coatings may be provided. Some embodiments of the invention place reactive components into a coating, wherein the reactive components are later exploited, such as upon a breach or break in the coating, thereby providing on-demand corrosion protection. Particle segregation within the coating enables the use of multiple species that are incompatible or reactive with each other, wherein a first species is separated from a second species until a trigger occurs to allow the first and second species to react with each other.

Potential triggers include, but are not limited to, a break or structural weakness in the coating caused physically or chemically; thermal stress break or weakening; hydrolytic stress; pH (acid and/or base) stress; temperature, pH, mechanical force, and/or ultraviolet rays. The trigger may be intentional or unintentional (e.g., caused by environmental factors).

Unless otherwise indicated, all references to "phases" in this patent application are in reference to solid phases. The solid phases are typically polymeric and may melt or at least undergo a glass transition at elevated temperatures. Reference to multiple solid phases in a composition or microstructure means that there are at least two distinct chemical phases that are solid, without forming a solid solution or homogeneous mixture.

As intended in this patent application, "phase inhomogeneity," "inhomogeneous microstructure," and the like mean that a multiphase microstructure is present in which there are at least two discrete phases that are separated from each other. The two phases may be one discrete solid phase in a continuous solid phase, two co-continuous solid phases, or two discrete solid phases in a third continuous solid phase, for example. FIG. 1 is an exemplary optical image (confocal laser scanning microscopy) depicting phase inhomogeneity, from Example 6, for purposes of illustration.

This patent application hereby expressly incorporates by reference herein U.S. patent application Ser. No. 14/829,640 for "SEGMENTED COPOLYMER COMPOSITIONS AND COATINGS INCORPORATING THESE COMPOSITIONS" filed on Aug. 19, 2015 and published as U.S. Patent App. Pub. No. 2016/0194574 on Jul. 7, 2016. This patent application hereby expressly incorporates by reference herein U.S. patent application Ser. No. 15/608,975 for "COMPOSITIONS AND METHODS FOR FABRICATING DURABLE, LOW-ICE-ADHESION COATINGS" filed on May 30, 2017 and published as U.S. Patent App. Pub. No. 2017/0267871 on Sep. 21, 2017.

Some embodiments utilize polymeric coating compositions containing at least two phases that microphase-separate at microscopic length scales, including at a surface (such as a coating). In some embodiments, one phase contains a segmented urethane/urea copolymer composition that includes a fluoropolymer, a polyether, and a polyurethane.

Some embodiments employ fluoropolymers, without limitation of the invention, as described in more detail herein. A preferred technique to compatibilize fluoropolymers and hygroscopic materials is the use of segmented polyurethane or urea systems. These species demonstrate strong hydrogen bonding potential between them and as a result can create strong associative forces between the chains. In order to produce elastomeric materials, regions of highly flexible and weakly interacting chains (soft segments) must be incorporated with strongly associating elements (hard segments) and this can be provided in a segmented copolymerization scheme. Segmented copolymers provide a straightforward synthetic route toward block architectures using segments with vastly differing properties. Such synthesis results in chains that possess alternating hard and soft segments composed of regions of high urethane bond density and the chosen soft segment component (e.g., fluoropolymer or hygroscopic element), respectively. This covalent linkage of dissimilar hard and soft blocks drives the systems to microphase separation and creates regions of flexible soft blocks surrounding regions of hard blocks. The associative forces among the hard segments prevent flow under stress and can produce elastomeric materials capable of displaying high elongation and tensile strength.

Some variations of this invention provide a multiphase polymer composition comprising a first polymer material and a second polymer material that are chemically distinct, wherein the first polymer material and the second polymer material are microphase-separated on a microphase-separation length scale from about 0.1 microns to about 500 microns, wherein the multiphase polymer composition comprises first solid functional particles selectively dispersed within the first polymer material, and wherein the first solid functional particles are chemically distinct from the first polymer material and the second polymer material.

The average length scale of phase inhomogeneity may be from about 1 micron to about 200 microns, such as from about 5 microns to about 100 microns, for example. In various embodiments, the average length scale of phase inhomogeneity is about, or at least about, 0.5, 1, 2, 3, 4, 5, 10, 20, 30, 40, 50, 60, 70, 80, 90, 100, 125, 150, 175, 200, or 250 microns.

As intended herein, a "solid functional particle" means a material that is a solid at a temperature of 25° C. and 1 bar pressure, in the form of particles such as with average particle size from about 50 nanometers to about 500 microns. The term "functional" is intended only to distinguish from inert fillers, i.e. the solid functional particle is selected for one or more functions in the multiphase polymer composition, such as (but not limited to) anti-corrosion, self-healing, self-cleaning, or flame retardancy.

During synthesis, solid functional particles may be introduced at one or more steps. Alternatively, or additionally, precursors of solid functional particles may be introduced, ultimately resulting in solid functional particles in the final multiphase polymer composition. The precursors may be non-solids, such as liquids or gels, that solidify during synthesis. Multiple precursors may be employed that chemically form solid functional particles during synthesis.

A wide range of concentrations of components may be present in the multiphase polymer composition. For example, the first polymer material may be from about 1 wt % to about 99 wt %, such as from about 5 wt % to about 50 wt % of the multiphase polymer composition. The second polymer material may be from about 1 wt % to about 99 wt %, such as from about 5 wt % to about 50 wt % of the multiphase polymer composition. The first solid functional particles may be from about 0.1 wt % to about 50 wt % of the multiphase polymer composition.

Within the first phase containing the first polymer material, the first polymer material may be from about 50 wt % to 100 wt %, such as about 60, 70, 80, 90, 95, or 100 wt %. Within that first phase, the first solid functional particles may be from about 0.1 wt % to about 50 wt % of the total weight of the first polymer material and the first solid functional particles, or the total weight of the first phase. The remainder of the material in the first phase may be polymeric (but a different polymer than the first polymer material) or non-polymeric (e.g., a filler).

Within a second phase containing the second polymer material, the second polymer material may be from about 50 wt % to 100 wt %, such as about 60, 70, 80, 90, 95, or 100 wt %. Within that second phase, second solid functional particles may be from about 0 wt % to about 50 wt % of the total weight of the second polymer material and the second solid functional particles, or the total weight of the second phase. The remainder of the material in the second phase may be polymeric (but a different polymer than the second polymer material) or non-polymeric (e.g., a filler).

In some variations, the multiphase polymer composition further comprises second solid functional particles selectively dispersed within the second polymer material, wherein the second solid functional particles are chemically distinct from the first polymer material and the second polymer material. The second solid functional particles, when present, may be from about 0.1 wt % to about 50 wt % of the multiphase polymer composition. The second solid functional particles, when present, may be from about 0.1 wt % to about 50 wt % of the total weight of the second polymer material and the second solid functional particles, or the total weight of applicable phase of the multiphase polymer composition.

In certain embodiments, the second solid functional particles, when present, are essentially not contained at all within the first polymer material—that is, less than 0.5 wt % of the phase containing the first polymer material consists of the second solid functional particles. In these or other certain embodiments, the first solid functional particles are essentially not contained at all within the second polymer material—that is, less than 0.5 wt % of the phase containing the second polymer material consists of the first solid functional particles.

The multiphase polymer composition may be characterized by a selectivity of solid functional particles contained within a certain phase, but not other phases, of a multiphase polymer composition.

The "first-particle selectivity" is defined as the fraction of first solid functional particles that are contained in the first polymer phase, relative to all first solid functional particles present in the overall composition. The first-particle selectivity may be about 50% or more, preferably about 75% or more, more preferably about 90% or more, and most preferably about 95% or more. In certain embodiments, the first-particle selectivity is about 99% or about 100% (i.e., essentially all of the first solid functional particles are contained in the first polymer phase). The first solid functional particles that are not contained in the first polymer phase may be in the second polymer phases and/or in other phases present (if any) in the multiphase polymer composition.

Similarly, the "second-particle selectivity" is defined as the fraction of second solid functional particles that are contained in the second polymer phase, relative to all second solid functional particles present in the overall composition. The second-particle selectivity may be about 50% or more, preferably about 75% or more, more preferably about 90% or more, and most preferably about 95% or more. In certain embodiments, the second-particle selectivity is about 99% or about 100% (i.e., essentially all of the second solid functional particles are contained in the second polymer phase). The second solid functional particles that are not contained in the second polymer phase may be in the first polymer phases and/or in other phases present (if any) in the multiphase polymer composition.

By "first solid functional particles selectively dispersed within the first polymer material," it is meant that the first-particle selectivity is at least 51%, preferably at least 75%, and more preferably at least 90%. Similarly, by "second solid functional particles selectively dispersed within the second polymer material," it is meant that the second-particle selectivity is at least 51%, preferably at least 75%, and more preferably at least 90%.

Particles may be coated with one polymer phase that is itself present as an inclusion in another polymer phase (see for example FIG. 1). In the context of selectivity, when particles are coated with a first polymer phase and the entire coated particle is present as an inclusion in a second polymer phase, those particles are deemed to be selective for (present in) the first polymer phase.

"Dispersed" solid functional particles means that those particles are present in the applicable polymer material as distinct particles or regions of material, not as a single layer or coating on top of or adjacent to that polymer material. The solid functional particles may be dispersed uniformly or non-uniformly within the polymer phase. As noted above, the solid functional particles may be dispersed such that at least some of the particles are coated with one polymer phase that is itself present as an inclusion in another polymer phase.

The first solid functional particles may have an average particle size from about 50 nanometers to about 500 microns, for example. In various embodiments, the first solid functional particles have an average particle size of about 0.1, 0.5, 1, 5, 10, 25, 50, 100, 200, 300, or 400 microns. The first solid functional particles may be characterized by various ranges of particle sizes and particle-size distributions.

The second solid functional particles, when present, may have an average particle size from about 50 nanometers to about 500 microns, for example. In various embodiments, the second solid functional particles have an average particle size of about 0.1, 0.5, 1, 5, 10, 25, 50, 100, 200, 300, or 400 microns. The second solid functional particles may be characterized by various ranges of particle sizes and particle-size distributions.

The first solid functional particles may be dissolvable in water or an aqueous solvent. Alternatively, or additionally, the first solid functional particles may be dissolvable in an organic solvent. Any of these solvents may be environmental solvents, i.e. fluids derived from the local environment, such as rain, ocean spray, melted snow or ice, humidity, fuel, cleaning fluid, hydraulic fluid, or anti-icing fluid.

In some embodiments, the first solid functional particles are capable of reacting with the second polymer material, in response to an environmental input selected from the group consisting of ultraviolet light, change in temperature, change in pressure, environmental solvents, change in humidity, change in pH, and combinations thereof. An exemplary combination of environmental inputs is prolonged exposure to ultraviolet light, causing local extremes in temperature or pH, which could lead to chemical degradation or flammability. Another exemplary combination is a change in pressure (force) causing a coating breach, followed by exposure to an environmental solvent that allows the first solid functional particles and the second polymer material to contact each other and then react.

The environmental input may act as a trigger to cause a physical change in the multiphase polymer composition, such as formation of a surface defect or a break in the bulk material. The environmental input may act as a trigger to cause a chemical change in the multiphase polymer composition, such as an alteration in chemical composition or a disruption of chemical phase stability. The trigger may be intentional or unintentional. The trigger, in turn, may allow the first solid functional particles to be transported (e.g., by convection or diffusion) from the first polymer material to the second polymer material, where reaction may occur between the solid functional particles and the polymer material. The mass transport of first solid functional particles may be aided by a fluid, such as water or another environmental solvent. Also note that in certain embodiments, the second polymer material (e.g., when in the form of inclusions) is transported to the location of the first solid functional particles contained with the first polymer material. In some embodiments, solid functional particles are not segregated to a surface or interface via particle preference for the air interface.

The first solid functional particles may be in close physical proximity with the second solid functional particles (when present), the second polymer material, and/or a substrate surface. The physical proximity will generally be on the same length scale as the microphase separation, i.e. from about 0.1 microns to about 500 microns (see Example 6), since the solid functional particles are selectively dispersed in the phases that are microphase-separated. When the multiphase polymer material is applied to a substrate, the solid functional particles will generally be in close physical proximity to the substrate since those particles are present throughout the bulk of the material, not just at the outer surface.

When the function of the solid functional particles is to be triggered with a break in a coating (in some embodiments), the break may vary widely in width, such as from about 10 microns to about 10 centimeters, e.g. about 100 microns to about 1 centimeter. The length of the break is virtually unlimited, depending on the specific coating application, but can be for example from about 100 microns to about 1 meter or more.

In some embodiments, the multiphase polymer composition is disposed on a surface, and the first solid functional particles are capable of reacting with the surface, in response to an environmental input selected from the group consisting of ultraviolet light, change in temperature, change in pressure, environmental solvents, change in humidity, change in pH, and combinations thereof. The same types of triggers mentioned above apply to reaction of solid functional particles with the surface. The mass transport of first solid functional particles to the surface may be aided by a fluid, such as water or another environmental solvent.

When second solid functional particles are present, the first solid functional particles and the second solid functional particles may be capable of reacting with each other in response to an environmental input selected from the group consisting of ultraviolet light, change in temperature, change in pressure, environmental solvents, change in humidity, change in pH, and combinations thereof. The same types of triggers mentioned above apply to reaction of first and second solid functional particles with each other. The mass transport of solid functional particles to find each other may be aided by a fluid, such as water or another environmental solvent. Also note that in various embodiments, the first solid functional particles may be transported while the second solid functional particles remain stationary in the second polymer material, or vice-versa. In some embodiments, both the first solid functional particles and the second solid functional particles are transported, at least to some extent, out of their respective phases.

In some embodiments, the second solid functional particles are unreactive with the first solid functional particles under conditions of use of the multiphase polymer composition, such as at ambient temperature, pressure, and humidity.

In preferred embodiments, the first solid functional particles are unreactive with the first polymer material, and the second solid functional particles (if present) are unreactive with the second polymer material. However, the invention is not limited to these embodiments; the first and second solid functional particles may be capable of reacting with the first and second polymer material, respectively—i.e. the material in which the respective solid functional particles are dispersed—in response to an environmental input.

When second solid functional particles are present, they may be capable of reacting with the first polymer material, in response to an environmental input selected from the group consisting of ultraviolet light, change in temperature, change in pressure, environmental solvents, change in humidity, change in pH, and combinations thereof. This is analogous to reaction of first solid functional particles with the second polymer material, described above.

In some embodiments, the multiphase polymer composition is disposed on a surface, and the second solid functional particles are included and capable of reacting with the surface, in response to an environmental input selected from the group consisting of ultraviolet light, change in temperature, change in pressure, environmental solvents, change in humidity, change in pH, and combinations thereof. This is also analogous to reaction of first solid functional particles with the surface, described above. It will be appreciated that many combinations of reactions and locations of reactions are possible.

The second solid functional particles may be dissolvable in water or an aqueous solvent. Alternatively, or additionally, the second solid functional particles may be dissolvable in an organic solvent. Any of these solvents may be environmental solvents, i.e. fluids derived from the local environment, such as rain, ocean spray, melted snow or ice, humidity, fuel, cleaning fluid, hydraulic fluid, or anti-icing fluid.

The first solid functional particles may include inorganic particles, organic particles, or a combination thereof. The second solid functional particles, when present, may include inorganic particles, organic particles, or a combination thereof.

The first solid functional particles may include oxidizing agents, reducing agents, or a combination thereof. The second solid functional particles, when present, may include oxidizing agents, reducing agents, or a combination thereof.

The first solid functional particles may be selected from the group consisting of metals, metal oxides (or other oxides, such as organic oxides), ceramics, salts, polymers, and combinations thereof. The first solid functional particles may be thermally stable or thermally unstable, such as thermally unstable at temperatures exceeding a temperature selected from 25° C. to 50° C.

The second solid functional particles, when present, may be selected from the group consisting of metals, metal oxides (or other oxides, such as organic oxides), ceramics, salts, polymers, and combinations thereof. The second solid functional particles may be thermally stable or thermally unstable, such as thermally unstable at temperatures exceeding a temperature selected from 25° C. to 50° C.

The first solid functional particles may be surface-treated to enhance chemical compatibility with the first polymer material. The second solid functional particles, when present, may be surface-treated to enhance chemical compatibility with the second polymer material. Surface treatment may adjust properties such as hydrophobicity, hydrophilicity, surface tension, polarity, and solubility.

In various embodiments, the first polymer material and the second polymer material are independently selected from the group consisting of polyesters, polyethers, polyacrylates, polymethacrylates, polyepoxides, polysiloxanes, cellulosic polymers, and combinations thereof.

Polyesters and polyethers may be selected from the group consisting of perfluoropolyethers, polyfluoroacrylates, polyfluorosiloxanes, polyvinylidene fluoride, polytrifluoroethylene, poly(oxymethylene), poly(ethylene glycol), poly(propylene oxide), poly(tetrahydrofuran), poly(glycolic acid), poly(caprolactone), poly(ethylene adipate), poly(hydroxyl butyrate), poly(hydroxyl alkanoate), and combinations thereof.

Polyacrylates, polymethacrylates, polyepoxides, polysiloxanes, and cellulosic polymers may be selected from the group consisting of polymethylmethacrylate, poly(acrylic acid), poly(2-hydroxyethyl methacrylate), poly(vinyl imidazole), poly(2-methyl-2-oxazoline), poly(2-ethyl-2-oxazoline), poly(vinylpyrolidone), polydimethylsiloxane, cellulose, cellulose hydrogels, methyl cellulose, carboxymethyl cellulose, hydroxyethyl cellulose, hydroxypropyl cellulose, and combinations thereof.

In some coatings, one of the first-material phase and the second-material phase is hydrophobic, and the other is hydrophilic. In these or other embodiments, one of the first-material phase and the second-material phase is hydrophobic, and the other is hygroscopic. In these or other embodiments, one of the first-material phase and the second-material phase is hygroscopic, and the other comprises a low-surface-energy polymer having a surface energy between about 5 mJ/m$^2$ to about 50 mJ/m$^2$.

"Hygroscopic" means that the material is capable of attracting and holding water molecules from the surrounding environment. The water uptake of various polymers is described in Thijs et al., "Water uptake of hydrophilic polymers determined by a thermal gravimetric analyzer with a controlled humidity chamber", *J. Mater. Chem.* (17) 2007, 4864-4871, which is hereby incorporated by reference herein. In some embodiments, the hygroscopic material is characterized by a water absorption capacity, at 90% relative humidity and 30° C., of at least 5, 10, 15, 20, 25, 30, 35, 40, 45, or 50 wt % increase due to water uptake.

In some embodiments, the hygroscopic material is selected from the group consisting of poly(acrylic acid), poly(ethylene glycol), poly(2-hydroxyethyl methacrylate), poly(vinyl imidazole), poly(2-methyl-2-oxazoline), poly(2-ethyl-2-oxazoline), poly(vinylpyrolidone), cellulose, modified cellulose, carboxymethyl cellulose, hydroxyethyl cellulose, hydroxypropyl cellulose, methyl cellulose, hydrogels, PEG diacrylate or monoacrylate, and combinations thereof.

A "low-surface-energy polymer" means a polymer with a surface energy of no greater than 50 mJ/m$^2$. In some embodiments, the low-surface-energy polymer is a fluoropolymer, such as selected from the group consisting of polyfluoroethers, perfluoropolyethers, polyfluoroacrylates, polyfluorosiloxanes, polytetrafluoroethylene (PTFE), polyvinylidene difluoride (PVDF), polyvinylfluoride (PVF), polychlorotrifluoroethylene (PCTFE), copolymers of ethylene and trifluoroethylene, copolymers of ethylene and chlorotrifluoroethylene, and combinations thereof.

In some embodiments, one of the first polymer material or the second polymer material is a continuous matrix, and the other of the first polymer material or the second polymer material is a plurality of inclusions, dispersed within the continuous matrix. Either the continuous matrix or the inclusions may be the first polymer material containing the first solid functional particles, and the continuous matrix or inclusions that do not contain the first solid functional particles optionally contain second solid functional particles.

The inclusions may be characterized as templates, domains, or regions (such as phase-separated regions). The inclusions are not a single, continuous framework in the coating. Rather, the inclusions are discrete, non-continuous and dispersed in the continuous matrix (see for example FIGS. 1 and 2). The inclusions may be dispersed uniformly within the continuous matrix. In some embodiments, the inclusions and the continuous matrix are covalently connected in a block copolymer, in which the inclusions and the continuous matrix are distinct phases of the block copolymer, such as a segmented block copolymer.

As intended herein, a "block copolymer" means a copolymer containing a linear arrangement of blocks, where each block is defined as a portion of a polymer molecule in which the monomeric units have at least one constitutional or configurational feature absent from the adjacent portions. Several types of block copolymers are generally possible, including AB block copolymers, ABA block copolymers, ABC block copolymers, segmented block copolymers, and random copolymers. Segmented block copolymers are preferred, in embodiments of the invention.

When the multiphase polymer composition contains inclusions within a continuous matrix, the continuous matrix may be from about 5 wt % to about 95 wt %, such as from about 10 wt % to about 50 wt % of the multiphase polymer composition. The inclusions may be from about 1 wt % to about 90 wt %, such as from about 10 wt % to about 50 wt % of the multiphase polymer composition. Within the continuous matrix, the polymer may be from about 50 wt % to 100 wt %, such as about 60, 70, 80, 90, 95, or 100 wt %. Within the inclusions, the other polymer may be from about 50 wt % to 100 wt %, such as about 60, 70, 80, 90, 95, or 100 wt %.

The continuous matrix and the inclusions may be covalently bonded with each other, directly or via reactive species contained within and/or between the continuous matrix and the inclusions. In some embodiments, the reactive species include an isocyanate species and an alcohol or amine with functionality of 2 or greater. An isocyanate species may be selected from the group consisting of 4,4'-methylenebis(cyclohexyl isocyanate), hexamethylene diisocyanate, cycloalkyl-based diisocyanates, tolylene-2,4-diisocyanate, 4,4'-methylenebis(phenyl isocyanate), isophorone diisocyanate, and combinations or derivatives thereof. In these or other embodiments, the reactive species includes an epoxy and an alcohol, amine, or thiol with functionality of 2 or greater.

In some embodiments, the continuous matrix and the inclusions are covalently bonded with each other via reactive species, in a segmented block copolymer containing first soft segments and second soft segments, wherein one of the continuous matrix or the inclusions contain the first soft segments, and wherein the other of the continuous matrix or the inclusions contain the second soft segments.

Some embodiments can be understood with reference to FIG. 1, as an exemplary microphase-separated multiphase polymer composition (Example 6). The scale bar is 100 μm. The phase inhomogeneity can be characterized by a length scale associated with a discrete phase 120. For example, the length scale of phase inhomogeneity may refer to the average size (e.g., effective diameter) of discrete inclusions 120 dispersed in a continuous phase 110. The selected (for illustration) discrete phase inclusions 120 labeled in FIG. 1 have an effective diameter of about 50-100 microns; generally the inclusions have an effective diameter of about 1 to 100 microns in this image. The length scale of phase inhomogeneity may refer to the average center-to-center distance between nearest-neighbor inclusions of the same phase 120. In FIG. 1, the center-to-center distance varies from about 5 microns to about 50 microns. The length scale of phase inhomogeneity may alternatively refer to the average separation distance between nearest-neighbor regions of the discrete (e.g., droplets) phase 120, i.e. the size of the continuous phase 110 regions. In FIG. 1, the separation distance varies from about 5 microns to about 200 microns. The average length scale of phase inhomogeneity is in the range of about 1 micron to about 200 microns in FIG. 1.

The average length scale of phase inhomogeneity may generally be from about 0.1 microns to about 500 microns, which in this disclosure is also generally referred to as "microphase separation." In some embodiments, the average length scale of phase inhomogeneity is from about 0.5 microns to about 100 microns, such as about 1 micron to about 50 microns. In various embodiments, the average length scale of phase inhomogeneity is about 0.1, 0.2, 0.3, 0.4, 0.5, 0.6, 0.7, 0.8, 0.9, 1, 2, 3, 4, 5, 10, 15, 20, 25, 30, 35, 40, 45, 50, 60, 70, 80, 90, 100, 150, 200, 250, 300, 350, 400, 450, or 500 microns, including any intermediate values not explicitly recited, and ranges starting, ending, or encompassing such intermediate values. These are average values, noting that a portion of phase inhomogeneity may be present on a length scale less than 0.1 micron or greater than 500 microns (e.g., about 1000 microns), with the overall average falling in the range of 0.1-500 microns.

Generally, the multiphase polymer composition may contain a segmented block copolymer, wherein the first polymer material consists essentially of first soft segments of the segmented block copolymer, and wherein the second polymer material consists essentially of second soft segments of the segmented block copolymer.

In certain embodiments, the segmented copolymer composition comprises:

(a) one or more the first soft segments selected from fluoropolymers having an average molecular weight from about 500 g/mol to about 10,000 g/mol, wherein the fluoropolymers are $(\alpha,\omega)$-hydroxyl-terminated and/or $(\alpha,\omega)$-amine-terminated;

(b) one or more the second soft segments selected from polyesters or polyethers, wherein the polyesters or polyethers are $(\alpha,\omega)$-hydroxyl-terminated and/or $(\alpha,\omega)$-amine-terminated, wherein the molar ratio of the second soft segments to the first soft segments is optionally less than 2.0;

(c) one or more isocyanate species, or a reacted form thereof, possessing an isocyanate functionality of 2 or greater; and (d) one or more polyol or polyamine chain extenders or crosslinkers, or a reacted form thereof.

The fluoropolymer may be selected from the group consisting of polyfluoroethers, perfluoropolyethers, polyfluoroacrylates, polyfluorosiloxanes, polytetrafluoroethylene, polyvinylidene difluoride, polyvinylfluoride, polychlorotrifluoroethylene, copolymers of ethylene and trifluoroethylene, copolymers of ethylene and chlorotrifluoroethylene, and combinations thereof.

The fluoropolymers may be present in the triblock structure:

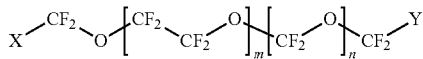

wherein:
X, Y=$CH_2$—(O—$CH_2$—$CH_2$)$_p$-T, and X and Y are independently selected;
p=1 to 50;
T is a hydroxyl or amine terminal group;
m=1 to 100; and
n=0 to 100.

It is noted that $(\alpha,\omega)$-terminated polymers are terminated at each end of the polymer. The $\alpha$-termination may be the same or different than the w-termination. Also it is noted that in this disclosure, "$(\alpha,\omega)$-termination" includes branching at the ends, so that the number of terminations may be greater than 2 per polymer molecule. The polymers herein may be linear or branched, and there may be various terminations and functional groups within the polymer chain, besides the end $(\alpha,\omega)$ terminations.

In some embodiments, the molar ratio of the second soft segments to the first soft segments is from about 0.1 to about 1.5. In various embodiments, the molar ratio of the second soft segments to the first soft segments is about 0.05, 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, or 1.95.

In this description, "polyurethane" is a polymer comprising a chain of organic units joined by carbamate (urethane) links, where "urethane" refers to N(H)—(C=O)—O—. Polyurethanes are generally produced by reacting an isocyanate containing two or more isocyanate groups per molecule with one or more polyols containing on average two or more hydroxyl groups per molecule, in the presence of a catalyst.

Polyols are polymers in their own right and have on average two or more hydroxyl groups per molecule. For example, $\alpha,\omega$-hydroxyl-terminated perfluoropolyether is a type of polyol.

"Isocyanate" is the functional group with the formula —N=C=O. For the purposes of this disclosure, O—C(=O)—N(H)—R is considered a derivative of isocyanate.

"Polyfluoroether" refers to a class of polymers that contain an ether group—an oxygen atom connected to two alkyl or aryl groups, where at least one hydrogen atom is replaced by a fluorine atom in an alkyl or aryl group.

"Perfluoropolyether" (PFPE) is a highly fluorinated subset of polyfluoroethers, wherein all hydrogen atoms are replaced by fluorine atoms in the alkyl or aryl groups.

"Polyurea" is a polymer comprising a chain of organic units joined by urea links, where "urea" refers to N(H)—(C=O)—N(H)—. Polyureas are generally produced by reacting an isocyanate containing two or more isocyanate groups per molecule with one or more multifunctional amines (e.g., diamines) containing on average two or more amine groups per molecule, optionally in the presence of a catalyst.

A "chain extender or crosslinker" is a compound (or mixture of compounds) that link long molecules together and thereby complete a polymer reaction. Chain extenders or crosslinkers are also known as curing agents, curatives, or hardeners. In polyurethane/urea systems, a curative is typically comprised of hydroxyl-terminated or amine-terminated compounds which react with isocyanate groups present in the mixture. Diols as curatives form urethane linkages, while diamines as curatives form urea linkages. The choice of chain extender or crosslinker may be determined by end groups present on a given prepolymer. In the case of isocyanate end groups, curing can be accomplished through chain extension using multifunctional amines or alcohols, for example. In some embodiments, the prepolymer has excess hydroxyl and/or amine functional groups and thus is curable with an isocyanate curing agent.

Chain extenders or crosslinkers can have an average functionality greater than 2 (such as 2.5, 3.0, or greater), i.e. beyond diols or diamines. In some embodiments, polymeric forms of polyol chain extenders or crosslinkers are utilized, typically hydrocarbon or acrylic backbones with hydroxyl groups distributed along the side groups. These crosslinkers typically possess a functionality of much greater than 2. The one or more chain extenders or crosslinkers (or reaction products thereof) may be present in a concentration, in the segmented copolymer composition, from about 0.01 wt % to about 25 wt %, such as about 0.05 wt % to about 10 wt %.

The polyol or polyamine chain extenders or crosslinkers may be selected from the group consisting of 1,3-butanediol, 1,4-butanediol, 1,3-propanediol, 1,2-ethanediol, diethylene glycol, triethylene glycol, tetraethylene glycol, propylene glycol, dipropylene glycol, tripropylene glycol, neopentyl glycol, 1,6-hexanediol, 1,4-cyclohexanedimethanol, ethanol amine, diethanol amine, methyldiethanolamine, phenyldiethanolamine, glycerol, trimethylolpropane, 1,2,6-hexanetriol, triethanolamine, pentaerythritol, ethylenediamine, 1,3-propanediamine, 1,4-butanediamine, diethyltoluenediamine, dimethylthiotoluenediamine, isophoronediamine, diaminocyclohexane, N,N,N',N'-tetrakis (2-hydroxypropyl) ethylenediamine, and homologues, derivatives, or combinations thereof. In certain embodiments, the polyol or polyamine chain extenders or crosslinkers possess an average functionality of about 3 or greater.

The isocyanate species may be selected from the group consisting of 4,4'-methylenebis(cyclohexyl isocyanate), hexamethylene diisocyanate, cycloalkyl-based diisocyanates, tolylene-2,4-diisocyanate, 4,4'-methylenebis(phenyl isocyanate), isophorone diisocyanate, and combinations or derivatives thereof.

Following a suitable chemical reaction, the segmented copolymer composition contains, in a hard segment, the reacted form of the one or more isocyanate species, combined with the reacted form of the one or more polyol or polyamine chain extenders or crosslinkers. In some embodiments, the hard segment is present in an amount from about 5 wt % to about 60 wt %, based on total weight of the composition.

In a segmented copolymer composition, a total content of one or more first soft segments and one or more second soft segments is present in an amount of from about 40% by weight to about 90% by weight, based on a total weight percent of the composition. The composition further comprises one or more hard segments present in an amount of from about 15% by weight to about 50% by weight, based on the total weight percent of the composition.

Optionally, the multiphase polymer composition may further include one or more additional components selected from a particulate filler, a pigment, a dye, a plasticizer, a flame retardant, a colorant, a UV absorber, a defoamer, a plasticizer, a viscosity modifiers, a density modifier, a catalyst, a scavenger, or a combination thereof. The particulate filler may be selected from the group consisting of silica, alumina, silicates, talc, aluminosilicates, barium sulfate, mica, diatomite, calcium carbonate, calcium sulfate, carbon, wollastonite, and combinations thereof.

In some embodiments, the multiphase polymer composition further includes a solid-state lubricant, dispersed in one phase or dispersed throughout the polymer, distinct from the functional solid particles. Solid-state lubricants may be selected from the group consisting of graphite, graphene, molybdenum disulfide, tungsten disulfide, hexagonal boron nitride, poly(tetrafluoroethylene), and combinations thereof. The solid-state lubricants may be particles having outer surfaces coated with a metal selected from the group consisting of cadmium, lead, tin, zinc, copper, nickel, and combinations or alloys thereof.

Optionally, the multiphase polymer composition, when applied to a substrate, further includes an adhesion promoter within its composition and/or added to the substrate. The adhesion promoter may be selected from the group consisting of a silane, a polysilane, a silazane, a polysilazane, an epoxy-based material, and combinations thereof. Other adhesion promoters may be utilized. The adhesion promoter should increase the chemical and/or physical adhesion of the coating material, compared to the surface without the adhesion promoter. The necessity and choice of adhesion promoter will depend at least on the material of the bare surface (e.g., aluminum, carbon fibers, etc.).

Phase inhomogeneity typically causes opaque coatings due to the scattering of light. Scattering of light including visible wavelengths in the bulk of a material is governed by changes in the index of refraction through the medium. Variations in refractive index at length scales near the wavelength of the propagating radiation will tend to scatter those wavelengths more effectively (Mie scattering), resulting in an opaque or white appearance for a coating. With visible light having a wavelength range of about 400-700 nm, a clear or transparent coating must typically keep variations in index of refraction below about 50 nm in length. As phase inhomogeneities increase in length scale, the opacity of the material rises. Phase inhomogeneities with average length scale from 0.1 μm to 500 μm are expected to drive significant scattering in the material, leading to opaque structures above 25 μm in thickness—unless the multiple phases happen to be refractive index-matched. See Althues et al., "Functional inorganic nanofillers for transparent polymers", *Chem. Soc. Rev.,* 2007, 36, 1454-1465, which is hereby incorporated by reference herein for its teaching that materials with inhomogeneity below 50 nm will tend to be clear, and materials with inhomogeneity above 50 nm (0.05 μm) will tend to be more opaque. The coating may be characterized by a coating transparency of less than 70% average light transmission in the wavelength range of 400 nm to 700 nm, through a 1-millimeter-thick coating sample (defined test depth), or a transparency less than about 65%, 60%, 55%, 50%, 45%, 40%, 35%, 30%, 25%, 20%, 15%, or 10% average light transmission in the wavelength range of 400 nm to 700 nm, through a 1-millimeter-thick coating sample.

The inhomogeneity exists throughout the material, in both planar and depth dimensions. That it, the microphase separation is not just a surface effect and will be present even if the coatings are eroded over time. The coating function is retained even after abrasion (for whatever reason) of the top layer of the material. Relatively thick coatings offer good durability and mechanical properties, such as impact resistance, while being relatively lightweight. In certain embodiments, a coating has a thickness from about 10 microns to about 10 millimeters. The overall thickness of the final material or coating may be from about 1 μm to about 1 cm or more, such as about 5 µm, 10 µm, 20 µm, 25 µm, 30 µm, 40 µm, 50 µm, 75 µm, 100 µm, 200 µm, 300 µm, 400 µm, 500 µm, 750 µm, 1 mm, 2 mm, 3 mm, 4 mm, 5 mm, 6 mm, 7 mm, 8 mm, 9 mm, 10 mm, or more. If desired, a coating may have a varying thickness, such as greater thickness at high surface curvature, for example.

In various embodiments, the material is a coating and/or is present at a surface of an object or region. In principle, the material could be present within a bulk region of an object or part.

The multiphase polymer composition may be present in or as a coating, such as (but not limited to) an anti-corrosion coating applied to a metallic substrate. Certain embodiments with respect to anti-corrosion coatings will now be described, and it will be understood that the same or similar principles may be applied to other coatings, such as (but not limited to) self-cleaning, self-lubricating, self-healing, or flame-retardant coatings.

Anti-Corrosion Coatings

Corrosion converts a metal to a more chemically stable form, such as its oxide, hydroxide, or sulfide. Corrosion gradually destroys metals by chemical and/or electrochemical reaction with their environment. Rusting, the formation of iron oxides, is a well-known example of electrochemical corrosion. Corrosion can also occur in materials other than metals, such as ceramics or polymers. Corrosion degrades the useful properties of materials and structures including strength, appearance, and permeability to liquids and gases. Many structural alloys corrode merely from exposure to moisture in air, but the process can be strongly affected by exposure to certain substances. Corrosion can be concentrated locally to form a pit or crack, or it can extend across a wide area more or less uniformly corroding the surface. Because corrosion is a diffusion-controlled process, it occurs on exposed surfaces. Therefore, anti-corrosion coatings on those surfaces are of wide interest commercially.

A particular application of interest includes, without limitation, corrosion resistant primers or base coats. Effective anti-corrosion coatings on the market contain hexavalent chromate, $Cr^{6+}$, which is toxic, is an environmental hazard, and is being phased out of most commercial coatings due to existing and pending regulations.

In a specific embodiment, a nontoxic form of chromium, chromium(III) oxide ($Cr_2O_3$), may be used with an oxidant (e.g., $KMnO_4$) to form $Cr^{3+}$ and/or $Cr^{6+}$ in situ (such as in a crack or break in the coating) and only when needed, greatly reducing the use and necessary disposal of hazardous $Cr^{6+}$ compounds.

A variety of possible corrosion inhibitor compounds may be incorporated into multiphase polymer structures, including (i) redox reaction-type inhibitors (which form a barrier layer from a redox reaction), such as those with oxo-metal anion precursors (e.g., $CrO^{4-}$ or $MnO^{4-}$); (ii) hydrolysis reaction-type inhibitors (which also form a barrier layer from a hydrolysis reaction), such as those with metal precursors (e.g., $TiF_6^{2-}$ or Ti sol-gels); (iii) anodic polarization-type inhibitors (which protect the surface using a sacrificial species), such as anodic metal particles (e.g., Mg particles); (iv) adsorbate-type inhibitors (which form a barrier layer from molecularly adsorbed species), such as organic inhibitors; and (v) combinations thereof.

In certain embodiments, a single-component corrosion inhibitor is introduced into one phase of a multiphase polymer composition, while the other phase(s) is (are) tailored or optimized for other properties (e.g., strength, elasticity, etc.).

Some variations of the invention provide an anti-corrosion composition comprising a first polymer material and a second polymer material that are chemically distinct, wherein the first polymer material and the second polymer material are microphase-separated on a microphase-separation length scale from about 0.1 microns to about 500 microns, wherein the multiphase polymer composition comprises first corrosion-inhibitor particles or precursors selectively dispersed within the first polymer material, wherein the multiphase polymer composition optionally further comprises second corrosion-inhibitor particles or precursors selectively dispersed within the second polymer material, and wherein the first corrosion-inhibitor particles or precursors and the second corrosion-inhibitor particles or precursors are chemically distinct from the first polymer material and the second polymer material.

Any known corrosion inhibitors may be employed as corrosion-inhibitor particles, or as part of corrosion-inhibitor particles. Corrosion inhibitors may be selected based on the material to be protected (usually a metal or metal alloy) and on the potential corrosive agent(s) to be neutralized. Corrosive agents include (but are not limited to) oxygen, carbon dioxide, hydrogen sulfide. Oxygen may be removed by reductive inhibitors, such as amines and hydrazines, which convert oxygen to water, which is generally benign. Related inhibitors of oxygen corrosion are hexamine, phenylenediamine, dimethylethanolamine, and their derivatives. Antioxidants such as sulfite and ascorbic acid may be used. Some corrosion inhibitors, such as benzotriazole, form a passivating coating on the surface by chemisorption. Other exemplary corrosion inhibitors include zinc phosphate, zinc dithiophosphates, benzalkonium chloride, and compounds derived from tannic acid or zinc salts of organonitrogens.

In some embodiments, the first corrosion-inhibitor particles or precursors and/or the second corrosion-inhibitor particles or precursors (when present) are selected from the group consisting of redox reaction-type inhibitors, hydrolysis reaction-type inhibitors, anodic polarization-type inhibitors, adsorbate-type inhibitors, and combinations thereof.

In some embodiments, a corrosion-inhibitor particle or precursor is a precursor that itself is not necessarily effective to prevent corrosion, but which may be converted to a corrosion inhibitor following a reaction caused by an environmental trigger, which may be intentional or unintentional.

In some embodiments, the corrosion inhibitor is present in the form of multiple precursors that are physically separated in the first and second particles contained in the first polymer material and second polymer material, respectively. These precursors may come together in response to an environmental trigger, and react to form a corrosion inhibitor or anti-corrosion layer.

In certain exemplary embodiments, the first corrosion-inhibitor particles or precursors include ammonium hexafluorotitanate, and the second corrosion-inhibitor particles or precursors include boric acid. In these embodiments, the second corrosion-inhibitor particles or precursors may further include a salt, such as sodium chloride. In these or other exemplary embodiments, the first corrosion-inhibitor particles or precursors include chromium(III) oxide, and the second corrosion-inhibitor particles or precursors include potassium permanganate.

In some embodiments employing the second corrosion-inhibitor particles or precursors, the first corrosion-inhibitor particles or precursors and the second corrosion-inhibitor particles or precursors are capable of reacting with each other in response to an environmental input selected from the group consisting of ultraviolet light, change in temperature, change in pressure, environmental solvents, change in humidity, change in pH, and combinations thereof.

In some embodiments employing the second corrosion-inhibitor particles or precursors, the anti-corrosion composition is disposed on a metal-containing substrate, wherein the first corrosion-inhibitor particles or precursors and the second corrosion-inhibitor particles or precursors are capable of reacting with each other to form a passivation coating or anti-corrosion layer on the metal-containing substrate. An anti-corrosion layer reduces the corrosion potential of the underlying metal-containing substrate.

Methods

Some preferred variations segregate reactive species during synthesis, i.e. particles that are reactive with each other are kept physically separated during the initial synthesis, allowing a selected polymer phase to coat the reactive particles. Two distinct portions of the polymer, e.g. first and second soft segments, are then combined such that the particles remain in different phases as the two incompatible phases separate, while maintaining the mechanical integrity of the resulting coating. Incorporation of reactive species into the coating enables the species to be isolated (i.e., not in chemical contact), yet be in close physical proximity for an externally triggered reaction. After coating damage, the reactive particles may be passively activated by environmental changes including, but not limited to, temperature, pH, mechanical force, and/or ultraviolet rays.

In the case of segmented copolymers, the initial prepolymer reaction preferably takes place in separate reaction vessels to form first and second soft segments. These separate reaction products are then combined and may be applied to a surface in the presence of a curative to result in a multiphase polymer coating.

Segmented copolymers are typically created by combining a flexible oligomeric soft segment terminated with alcohol or amine reactive groups and a multifunctional isocyanate. When the isocyanate is provided in excess to the alcohol/amine reactive groups, a viscous prepolymer mixture with a known chain length distribution is formed. This can then be cured to a high-molecular-weight network through the addition of amine or alcohol reactive groups to bring the ratio of isocyanate to amine/alcohol groups to unity. The product of this reaction is a chain backbone with alternating soft segments composed of flexible oligomers and hard segments comprised of the reaction product of low molecular weight isocyanates and alcohol/amines. Due to the chemical immiscibility of these two phases, the material will typically phase separate on the length scale of these individual blocks, creating a microstructure of flexible regions adjacent to rigid segments strongly associated through hydrogen bonding of the urethane/urea moieties. This combination of flexible and associated elements typically produces a physically crosslinked elastomeric material. Incorporation of two or more soft segment oligomer blocks into a segmented polyurethane system causes the separate oligomer blocks to microphase-separate.

A significant difference in the synthesis, according to some embodiments, is the segregation of the two soft segments during the majority of the prepolymer formation. This allows potentially reactive particles to be incorporated into each phase of the polymer, with minimal particle mixing, but placing them in close physical proximity for a latent triggered reaction. The initial prepolymer reaction may be performed in two separate reaction pots, keeping the soft segments and the chosen particle additives physically separated. After each soft segment is sufficiently reacted, the two pots may be combined into one pot, mixed for a short time, and finally through the addition of amine or alcohol reactive groups the coating may be cured to a high-molecular-weight network.

An advantage of this synthesis technique is the unique structure that forms, which contains segregated incompatible or reactive particles in a single coating. The proximity advantage allows the particles themselves to be chosen to perform a particular function when they are combined and react after a defined trigger (such as a break in the coating) to form a protective (e.g., passivating) coating.

Variations of the invention also provide a method of making a multiphase polymer composition, the method comprising:

(a) in a first reaction container, synthesizing a first polymer material from first-polymer starting components;

(b) in a second reaction container, synthesizing a second polymer material from second-polymer starting components, wherein the second polymer material is chemically distinct from the first polymer material;

(c) introducing a plurality of first solid functional particles into the first reaction container, to dispose the first solid functional particles in the first polymer material, wherein the first solid functional particles are chemically distinct from the first polymer material and the second polymer material;

(d) optionally introducing a plurality of second solid functional particles into the second reaction container, to disperse the second solid functional particles in the second polymer material;

(e) providing reactive species capable of covalently bonding the first polymer material with the second polymer material; and (f) combining the first polymer material, the second polymer material, and the reactive species to covalently bond the first polymer material with the second polymer material, thereby generating a multiphase polymer composition, wherein the multiphase polymer composition comprises the first solid functional particles selectively dispersed within the first polymer material, and wherein the first polymer material and the second polymer material are microphase-separated on a microphase-separation length scale from about 0.1 microns to about 500 microns.

When (d) is performed, the multiphase polymer composition comprises the second solid functional particles selectively dispersed within the second polymer material.

The multiphase polymer composition may be present in or as a coating. In some method embodiments, the first solid functional particles react in response to damage to the coating. The reaction can be with other first solid functional particles, with the second solid functional particles (when present), with a surface, with a fluid, or any combination thereof.

In some method embodiments, the second solid functional particles react in response to damage to the coating. The reaction can be with other second solid functional particles, with the first solid functional particles, with a surface, with a fluid, or any combination thereof.

In some method embodiments, the first solid functional particles react upon exposure to ultraviolet light, a change in temperature, a change in pH, a change in pressure, or a combination thereof. In some embodiments, the second solid functional particles also react upon exposure to ultraviolet light, a change in temperature, a change in pH, a change in pressure, or a combination thereof.

The first solid functional particles, the second solid functional particles, or both of these may be dissolved in aqueous or organic solvent that originates from the environment. For example, an aqueous or organic solvent may be selected from the group consisting of atmospheric humidity, rain, ocean spray, melted snow or ice, fuel, cleaning fluid, hydraulic fluid, anti-icing fluid, and combinations thereof.

In some methods, the coating is an anti-corrosion coating applied to a metallic substrate, wherein the first solid functional particles include first corrosion-inhibitor particles or precursors. The first solid functional particles may react with the metallic substrate to form a passivation coating or an anti-corrosion layer. The first solid functional particles may react with an aqueous or organic fluid that originates from the environment, such as atmospheric humidity, rain, ocean spray, fuel, cleaning fluid, hydraulic fluid, or anti-icing fluid, for example.

In some methods in which step (d) is performed and when the multiphase polymer composition is present in or as an anti-corrosion coating applied to a metallic substrate, the second solid functional particles include second corrosion-inhibitor particles or precursors. In these embodiments, the first solid functional particles and the second solid functional particles may react with each other to form a passivation coating or an anti-corrosion layer. In some embodiments, the first solid functional particles and the second solid functional particles react with each other and the metallic substrate to form a passivation coating or an anti-corrosion layer. In certain embodiments, the first solid functional particles and the second solid functional particles react with each other, the metallic substrate, and an aqueous or organic fluid that originates from the environment, to form a passivation coating or an anti-corrosion layer.

Optionally, a solvent may be present with the multiphase polymer material that is applied to a substrate surface. The solvent may be removed during or after the process of applying the coating, such as by drying, vacuum, curing, and so on.

These methods are different than patterning phase inhomogeneity by creating an inhomogeneous microstructure with microscale lithography. In some embodiments, the method does not employ multiple washing steps (i.e., to remove unreacted components from the polymer composition during synthesis). In some embodiments, no surface treatment of the solid functional particles is conducted.

The multiphase polymer composition, in some embodiments, is formed from a precursor material (or combination of materials) that may be provided, obtained, or fabricated from starting components. The precursor material is capable of hardening or curing in some fashion, to form a substantially continuous matrix along with a plurality of inclusions, dispersed within the matrix. The precursor material may be a liquid; a multiphase liquid; a multiphase slurry, emulsion, or suspension; a gel; or a dissolved solid (in solvent), for example.

The first polymer material and the second polymer material may be in the same phase or in different phases, within the precursor material. In some embodiments, the first polymer material is in liquid or dissolved form while the second polymer material is in dissolved-solid or suspended solid form. In some embodiments, the first polymer material is in dissolved-solid or suspended-solid form while the second polymer material is in liquid or dissolved form. In some embodiments, the first polymer material and the second polymer material are both in liquid form. In some embodiments, the first polymer material and the second polymer material are both in dissolved (solvent) form. Solventborne chemistry, waterborne chemistry, or a combination thereof may be employed.

In some embodiments of the invention, an emulsion sets up in the reaction mixture based on incompatibility between the two blocks (e.g., PEG and PFPE). The emulsion provides microphase separation in the precursor material. The precursor material is then cured from casting or spraying. The microphase separation survives the curing process (even if the length scales change somewhat during curing), providing the benefits in the final materials as described herein. Without being limited by theory, the microphase separation in this invention is not associated with molecular length-scale separation (5-50 nm) that many classic block-copolymer systems exhibit. Rather, the larger length scales of microphase separation, i.e. 0.1-500 µm, arise from the emulsion that was set-up prior to curing.

Xu et al., "Structure and morphology of segmented polyurethanes: 1. Influence of incompatibility on hard-segment sequence length," *POLYMER* 1983, Vol. 24, pages 1327-1332 and Chen et al., Structure and morphology of segmented polyurethanes: 2. Influence of reactant incompatibility," *POLYMER* 1983, Vol. 24, pages 1333-1340, are each hereby incorporated by reference herein for their teachings about emulsion set-up in polyurethane systems prior to curing.

In some variations of the invention, a material or coating precursor is applied to a substrate (such as a surface of an automobile or aircraft) and allowed to react, cure, or harden to form a final multiphase polymer material, such as a segmented copolymer composition containing at least first solid functional particles in a first polymer material. In some embodiments, a precursor material is prepared and then dispensed (deposited) over an area of interest. A fluid precursor material allows for convenient dispensing using spray coating or casting techniques over a large area, such as the scale of a vehicle or aircraft.

The fluid precursor material may be applied to a surface using any coating technique, such as (but not limited to) spray coating, dip coating, doctor-blade coating, spin coating, air knife coating, curtain coating, single and multilayer slide coating, gap coating, knife-over-roll coating, metering rod (Meyer bar) coating, reverse roll coating, rotary screen coating, extrusion coating, casting, or printing. The fluid precursor material may be rapidly sprayed or cast in thin layers over large areas (such as multiple square meters).

When a solvent or carrier fluid is present in the fluid precursor material, the solvent or carrier fluid may include one or more compounds selected from the group consisting of water, alcohols (such as methanol, ethanol, isopropanol, or tert-butanol), ketones (such as acetone, methyl ethyl ketone, or methyl isobutyl ketone), hydrocarbons (e.g., toluene), acetates (such as tert-butyl acetate or n-butyl acetate), acids (such as organic acids), bases, and any mixtures thereof. When a solvent or carrier fluid is present, it may be in a concentration of from about 10 wt % to about 99 wt %, for example.

The precursor material may be converted to an intermediate material or the final material using any one or more of curing or other chemical reactions, or separations such as removal of solvent or carrier fluid, monomer, water, or vapor. Curing refers to toughening or hardening of a polymeric material by crosslinking of polymer chains, assisted by electromagnetic waves, electron beams, heat, and/or chemical additives. Chemical removal may be accomplished by heating/flashing, vacuum extraction, solvent extraction, centrifugation, etc. Physical transformations may also be involved to transfer precursor material into a mold, for example. Additives may be introduced during the hardening process, if desired, to adjust pH, stability, density, viscosity, color, or other properties, for functional, ornamental, safety, or other reasons.

EXAMPLES

Example 1: Multiphase Modular Hydrophobic Coating from Two-Pot Synthesis

Materials. Poly(tetramethylene oxide) (PTMO) with $M_n$=2900 g/mol, 4,4'-methylenebis(cyclohexyl isocyanate) as a mixture of isomers (HMDI), 1,4-butanediol (BD), and dibutyltin dilaurate (DBTDL) are obtained from Sigma Aldrich and used as received. Fluorolink E10-H perfluoropolyether with $M_n$=1930 g/mol is purchased from Solvay and used as received. n-Butyl acetate (nBA) is obtained from Sigma Aldrich and dried over molecular sieves prior to use.

The following procedure affords about 21 g total polymer.

Pot 1: Perfluoropolyether Soft Segments.

6.031 g E10-H (0.5 mol equivalent) is weighed into a 3-neck round-bottomed flask equipped with a Teflon® mechanical stirrer. A slow purge with $N_2$ or Ar is started. The Pot 1 reaction set-up is secured with the mechanical stirrer and placed above a preheated silicone oil bath (100° C. target temperature). 2.46 mL (1.6 mol eq) HMDI is added using a syringe. The Pot 1 reaction set-up is then lowered into the silicone oil bath, and stirring is started at about 150 rpm. Using a micropipette, 2.02 µL (100 ppm) DBTDL is added. The Pot 1 reaction is allowed to proceed with stirring and inert purge for 2 hours.

Pot 2: PTMO Soft Segments.

Once the Pot 1 reaction above is initiated, the PTMO is placed in a drying oven to melt. Approximately 45 minutes into the Pot 1 reaction, the Pot 2 reaction is set up, as follows. 9.063 g PTMO (0.5 mol equivalent) is weighed into a 3-neck round-bottomed flask equipped with a Teflon® mechanical stirrer. A slow purge with $N_2$ or Ar is started. The Pot 2 reaction set-up is secured with the mechanical stirrer and placed above a preheated silicone oil bath (100° C. target temperature). 2.46 mL (1.6 mol eq) HMDI is added using a syringe. The Pot 2 reaction set-up is then lowered into the silicone oil bath, and stirring is started at about 150 rpm. Using a micropipette, 2.02 µL (100 ppm) DBTDL is added. The Pot 2 reaction is allowed to proceed with stirring and inert purge for 1 hour.

Combining Pot 1 and Pot 2.

After 2 hours from starting Pot 1, the silicone oil bath from Pot 1 is lowered, maintaining stirring and inert purge. Approximately 4.31 mL nBA (20 wt %) is added after about 2 minutes. The prepolymer is allowed to stir, dissolving and thinning out the solution. Meanwhile, 1 hour from starting Pot 2, the silicone oil bath from Pot 2 is lowered, maintaining stirring and inert purge. Stirring of Pot 2 is increased to 250 rpm. The contents of Pot 1 (prepolymer+solvent) are carefully poured into Pot 2. The solution is stirred for about 1 minute, wherein the prepolymer turns milky white. 1.21 mL (2.2 mol eq) BD is then added directly into the rapidly stirring solution. Stirring proceeds another 0.5 to 1 minute.

Preparing and Curing the Cast Coating.

The round-bottomed flask is then removed from the reaction set-up, and the solution is quickly poured onto silanized Mylar. A drawdown blade is used for making a thin film.

After casting the thin film, the film is placed into an oven to cure under inert atmospheric conditions for 2 hours at about 100° C., followed by 4 hours at about 80° C.

Example 2: Multiphase Hydrophobic Coating from One-Pot Synthesis

Materials. Poly(tetramethylene oxide) (PTMO) with $M_n$=2900 g/mol, 4,4'-methylenebis(cyclohexyl isocyanate) as a mixture of isomers (HMDI), 1,4-butanediol (BD), and dibutyltin dilaurate (DBTDL) are obtained from Sigma Aldrich and used as received. Fluorolink E10-H perfluoropolyether with $M_n$=1930 g/mol is purchased from Solvay and used as received. n-Butyl acetate (nBA) is obtained from Sigma Aldrich and dried over molecular sieves prior to use.

The following procedure affords about 17 g total polymer.

7.25 g PTMO (0.5 mol equivalent) is weighed into a 3-neck round-bottomed flask equipped with a Teflon® mechanical stirrer. A slow purge with $N_2$ or Ar is started. The reaction set-up is secured with the mechanical stirrer and placed above a preheated silicone oil bath (100° C. target temperature). 3.93 mL (1.6 mol eq) HMDI is added using a syringe. The reaction set-up is then lowered into the silicone oil bath, and stirring is started at about 150 rpm. Using a micropipette, 3.25 µL (200 ppm) DBTDL is added. The reaction is allowed to proceed with stirring and inert purge for 1 hour. After 1 hour, about 2.79 mL E10-H perfluoropolyether (0.5 mol eq) is added and the reaction proceeds for an additional 2 hours. The reaction flask is removed from heat, and 3.45 mL (about 20 wt %) n-butyl acetate is added, with increased stirring to 200 rpm. Once homogenized, 0.97 mL BD (2.2 mol eq) is added directly into the rapidly stirring solution. Stirring proceeds another 0.5 to 1 minute.

Preparing and Curing the Cast Coating.

The round-bottomed flask is then removed from the reaction set-up, and the solution is quickly poured onto silanized Mylar. A drawdown blade is used for making a thin film.

After casting of the thin film, the film is placed into an oven at about 85° C. to cure overnight.

Example 3: Mechanical Testing of the Example 1 and Example 2 Coatings

Changing the synthesis method (i.e., two-pot versus one-pot synthesis) risks altering the mechanical properties of the resulting material. This is a particular concern in these examples because the polymer elastomeric properties are highly dependent on achieving a microphase-separated morphology. Minimizing the residence time of the two soft segments, or prepolymer components, could impact the resulting microstructure and influence mechanical properties such that the coatings would no longer be industrially useful. To discern the potential impact on mechanical properties, films made via the synthesis routes described in Example 1 and Example 2 are cut into dogbones and subjected to tensile testing. Note that the cure profiles of the two samples are slightly different, which could impact the mechanical properties.

The tensile-testing results are as follows. The Example 2 (one pot) material has a percent elongation of 371±15(%) and an instant failure stress of 25.3±1.4 MPa. The Example 1 (two pot) material has a percent elongation of 334±6(%) and an instant failure stress of 37.5±1.7 MPa. There is minimal percent elongation difference between the one-pot and two-pot methods, Examples 2 and 1, respectively. Additionally, the modified synthesis (two pot) gives rise to a higher instant failure stress, compared to one-pot synthesis. These results confirm that the two-pot method is capable of making mechanically robust films.

Example 4: Multiphase Modular Hydrophilic Coating with Fluorescent Particles from Two-Pot Synthesis Materials. Poly(ethylene glycol) (PEG) with $M_n$=3350 g/mol, 4,4'-methylenebis(cyclohexyl isocyanate) as a mixture of isomers (HMDI), 1,4-butanediol (BD), and dibutyltin dilaurate (DBTDL) are obtained from Sigma Aldrich and used as received. Fluorolink D4000 perfluoropolyether with Mn=4000 g/mol is purchased from Solvay and used as received. n-Butyl acetate (nBA) is obtained from Sigma Aldrich and dried over molecular sieves prior to use. Red luminescent ultraviolet fluorescing polymer microspheres (1-5 microns in diameter) are obtained from Cospheric LLC (Santa Barbara, Calif., US) and used as received.

The following procedure affords about 21 g total polymer. In this example, Pot 1 and Pot 2 are initiated at approximately the same time.

Pot 1: PEG Soft Segments.

6.60 g PEG (1 mol equivalent) and 2.58 g HMDI (5 mol equivalent) are weighed into a 3-neck round-bottomed flask equipped with a Teflon® mechanical stirrer. A slow purge with $N_2$ or Ar is started. The Pot 1 reaction set-up is secured with the mechanical stirrer and placed into a preheated silicone oil bath (100° C. target temperature) to melt the PEG. After melting (approximately 10 minutes), stirring begins at about 150 rpm. Using a micropipette, 1.98 µL (100 ppm) DBTDL is added. The Pot 1 reaction is allowed to proceed with stirring and inert purge for 1 hour.

Pot 2: Perfluoropolyether Soft Segments and Fluorescent Particles 7.88 g Fluorolink D4000 perfluoropolyether (1 mol equivalent), 2.58 g HMDI (5 mol equivalent), and 0.1 wt % red fluorescent microparticles are weighed into a 3-neck round-bottomed flask equipped with a Teflon® mechanical stirrer. A slow purge with $N_2$ or Ar is started. The Pot 2 reaction set-up is secured with the mechanical stirrer and placed above a preheated silicone oil bath (100° C. target temperature). Stirring is initiated at about 150 rpm. Using a micropipette, 1.98 µL (100 ppm) DBTDL is added. The Pot 2 reaction is allowed to proceed with stirring and inert purge for 1 hour.

Combining Pot 1 and Pot 2.

After 1 hour from starting Pot 1, the silicone oil bath is lowered from Pot 1, maintaining stirring and inert purge. After about 2 minutes, approximately 4 mL nBA (20 wt %) is added and the prepolymer is allowed to stir, dissolving and thinning out the solution for about 4 to 7 minutes. Meanwhile, 1 hour from starting Pot 2, the silicone oil bath is lowered from Pot 2, maintaining stirring and inert purge. The stirring of Pot 2 is increased to 400 rpm and the contents of Pot 1 (prepolymer+solvent) are carefully poured into Pot 2. The total solution stirs for about 1 minute, wherein the combined prepolymer turns milky white. 1.39 mL (8 mol equivalent) BD is then added directly into the rapidly stirring solution. Stirring proceeds another 0.5 to 1 minute.

Preparing and Curing the Cast Coating.

The solution is quickly cast onto silanized Mylar. A drawdown blade is used for making a thin film.

After casting the thin film, the film is placed into an oven to cure under inert atmospheric conditions for 2 hours at about 100° C., followed by 4 hours at about 80° C.

Example 5: Multiphase Modular Hydrophilic Coating with Anti-Corrosion Particles from Two-Pot Synthesis Materials. Poly(ethylene glycol) (PEG) with $M_n$=3350 g/mol, 4,4'-methylenebis(cyclohexyl isocyanate) as a mixture of isomers (HMDI), 1,4-butanediol (BD), and dibutyltin dilaurate (DBTDL) are obtained from Sigma Aldrich and used as received. Ammonium hexafluorotitanate $(NH_4)_2TiF_6$ (AHFT) and boric acid $H_3BO_3$ are obtained from Sigma Aldrich and ground into smaller powders before use. n-Butyl acetate (nBA) is obtained from Sigma Aldrich and dried over molecular sieves prior to use. Fluorolink E10-H perfluoropolyether with $M_n$=1930 g/mol is purchased from Solvay and used as received.

The following procedure affords about 21 g total polymer. In this example, Pot 2 is initiated approximately 1 hour after Pot 1.

Pot 1: PEG Soft Segments.

12.14 g PEG (1 mol equivalent) and 2.99 g HMDI (3.2 mol equivalent) are weighed into a 3-neck round-bottomed flask equipped with a Teflon® mechanical stirrer. A slow purge with $N_2$ or Ar is started. The Pot 1 reaction set-up is secured with the mechanical stirrer and placed into a preheated silicone oil bath (100° C. target temperature) with stirring at about 150 rpm to melt the PEG. After about 10 min, 2.48 µL (100 ppm) DBTDL is added using a micropipette. The reaction proceeds with stirring and inert purge for about 3.5 hours.

Pot 2: Perfluoropolyether Soft Segments.

6.89 g E10-H (1 mol equivalent) and 2.99 g HMDI (3.2 mol equivalent) are weighed into a 3-neck round-bottomed flask equipped with a Teflon® mechanical stirrer. A slow purge with $N_2$ or Ar is started. The Pot 2 reaction set-up is secured with the mechanical stirrer and placed above a preheated silicone oil bath (100° C. target temperature). Stirring is initiated at about 150 rpm. Using a micropipette, 1.98 µL (100 ppm) DBTDL is added. The Pot 2 reaction proceeds with stirring and inert purge for 2 hours.

Adding Separate Particles to Soft Segments.

After 2 hours from starting Pot 2, the silicone oil bath is lowered from Pot 2, maintaining stirring and inert purge. After about 5 minutes, approximately 8 mL nBA is added and the prepolymer is allowed to stir, dissolving and thinning out the solution. After 5-7 min, 8.45 g AHFT is added to Pot 2 and the stirring rate is increased to 250-400 rpm. Meanwhile, about 3.5 hours from starting Pot 1, the silicone oil bath is lowered from Pot 1, maintaining stirring and inert purge. Stirring of Pot 1 is increased to 250 rpm and about 4 mL nBA is added. After 5-7 minutes, 3.97 g boric acid is added to Pot 1 and stirred.

Combining Pot 1 and Pot 2.

After about 5 minutes following the addition of boric acid to Pot 1, the contents of Pot 2 are carefully poured into Pot 1. The combined solution is allowed to stir for about 2 minutes. Then 1.39 mL (4.4 mol equivalent) BD is added directly into the rapidly stirring solution.

Preparing and Curing the Cast Coating.

Stirring proceeds another 20 seconds and the solution is quickly cast onto the preferred substrate(s).

For corrosion testing, films are cast onto an isopropanol-cleaned aluminum panel. A drawdown blade is used to make a 25 mil (635 µm) film and a spatula is used to help fill in any gaps during the coating process.

After casting, the film is placed into an oven to cure under inert atmospheric conditions for 1.5 hours at about 90° C., 2 hours at about 100° C., followed by 4 hours at about 80° C.

Example 6: Confocal Microscopy of Coating Microstructures

In this example, fluorescent particles are employed for confocal microscopy imaging. Confocal microscopy is an optical imaging technique that detects fluorescence by exposing the specimen to light of a certain wavelength to excite fluorescent dyes. Samples are prepared by soaking a thin slice of film in an aqueous solution containing fluorescein (10 to 100 µM), a water-soluble dye, for 24 hours. The thinner the film, the better for allowing light to go through the sample. Confocal microscopy allows imaging of xy-plane with thin optical z-slice to prevent background fluorescence. Water absorbed by the film contains fluorescein, allowing contrast between hydrophilic and hydrophobic domains. Once removed from the solution, the film is rinsed with DI water to remove excess fluorescein from the surface. The film is quickly pat dried to remove water droplets and placed on a glass slide (75×25 mm). A glass coverslip (0.17 mm thick) is placed firmly on the film and the edges are sealed with a quick cure 5-minute epoxy. The edges are sealed to prevent evaporation of water to allow optimal imaging of the specimen by better matching the refractive index of the glass. The fluorescent imaging is obtained using a Leica SP 5 confocal microscope with an Argon laser for an excitation wavelength of 488 nm for fluorescein.

The film from Example 4 is soaked in a 100 µM, neutral pH, aqueous solution of fluorescein. For this particular film, the soaking results in the PEG phase exhibiting a bright fluorescent green color under the microscope (excitation at 488 nm wavelength) and the D4000 (fluoropolymer) phase exhibiting no color (black) because it excludes water. Additionally, by changing the wavelength of the laser to about 607 nm, the luminescent ultraviolet fluorescing polymer microspheres incorporated into the fluoropolymer phase are also visible as red or yellow particles.

FIG. 1 shows a confocal laser scanning microscopy (CLSM) image for the microstructure 100 of the Example 4 coating. The scale bar of FIG. 1 is 100 µm. The fluorescent regions 110 (which display as green regions in the color drawing and lighter regions when reproduced in grayscale) are representative of hydrophilic PEG regions containing a water-soluble fluorescent dye. The inclusions 120 (which display as darker regions) are representative of hydrophobic fluoropolymer regions. The particles 130 (which display as red or yellow dots in the color drawing and bright white dots when reproduced in grayscale) are the luminescent ultraviolet fluorescing polymer microspheres added during the Pot 2 synthesis.

The discrete phase inclusions 120 in FIG. 1 have an effective diameter of about 50-100 microns; generally the inclusions have an effective diameter of about 1 to 100 microns in this image. In FIG. 1, the center-to-center distance between nearest-neighbor inclusions of the same phase 120 varies from about 5 microns to about 50 microns. In FIG. 1, the average separation distance between nearest-neighbor regions of the discrete (e.g., droplets) phase 120, i.e. the size of the continuous phase 110 regions, varies from about 5 microns to about 200 microns. The average length scale of phase inhomogeneity is in the range of about 1 micron to about 200 microns in FIG. 1. Also, the length scales of separation between luminescent ultraviolet fluorescing polymer particles 130 are the same, i.e. also from about 5 microns to about 200 microns, as the length scale of phase inhomogeneity.

As seen in FIG. 1, the majority of the luminescent ultraviolet fluorescing polymer particles 130 are in the microphase-separated fluoropolymer (dark) regions 120. Some of the ultraviolet fluorescing polymer microspheres are present as particles 130 contained in the fluorescent regions 110, showing a dark ring around those particles 130. This is indicative of a thin coating of fluoropolymer phase 120 surrounding some of the individual particles 130, which also means that they are actually contained in the fluoropolymer phase 120. This result demonstrates that the two-pot synthesis method successfully segregates particles into the desired phase. Even during the short mixing of the two phases, incompatible particles are coated and segregated. FIG. 1 confirms particle placement and retention in the intended phase domain.

To complement the tensile results (Example 3) and further confirm that the modified (two pot) synthesis provides materials with a similar microstructure to sequential (one pot) synthesis, a one-pot version of Example 4 is produced. In particular, the methodology of Examples 2 and 4 is utilized to produce a multiphase hydrophilic coating from one-pot synthesis, without luminescent ultraviolet fluorescing polymer microspheres.

Figure 2:
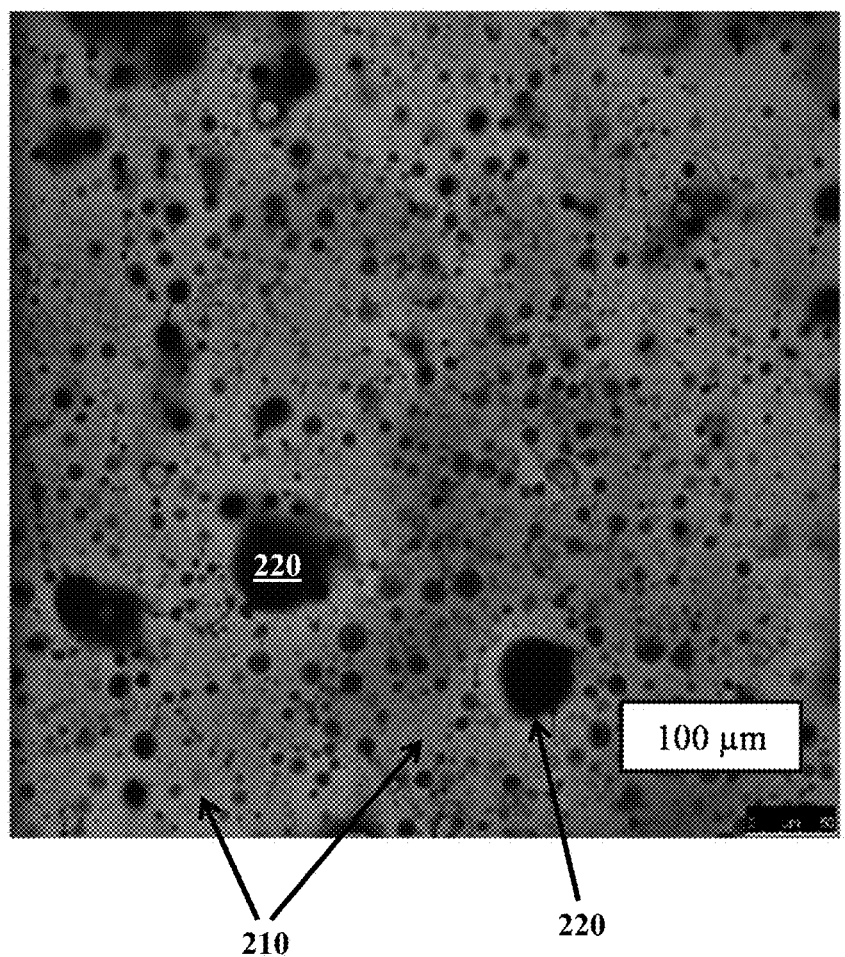
FIG. 2 is an exemplary image from confocal laser scanning microscopy depicting phase inhomogeneity from the one-pot version of Example 4.

FIG. 2 shows a confocal laser scanning microscopy (CLSM) image for the microstructure 200 of the one-pot version of Example 4. The scale bar of FIG. 2 is 100 µm. The fluorescent regions 210 (which display as green regions in the color drawing and lighter regions when reproduced in grayscale) are representative of hydrophilic PEG regions containing a water-soluble fluorescent dye. The inclusions 220 (which display as darker regions) are representative of hydrophobic fluoropolymer regions.

The discrete phase inclusions 220 in FIG. 2 have an effective diameter of about 50-100 microns; generally the inclusions have an effective diameter of about 1 to 50 microns in this image. In FIG. 2, the center-to-center distance between nearest-neighbor inclusions of the same phase 220 varies from about 5 microns to about 50 microns. In FIG. 2, the average separation distance between nearest-neighbor regions of the discrete (e.g., droplets) phase 220, i.e. the size of the continuous phase 210 regions, varies from about 5 microns to about 150 microns. The average length scale of phase inhomogeneity is in the range of about 1 micron to about 150 microns in FIG. 2.

Comparing FIGS. 1 and 2, it is observed that the two-pot synthesis (FIG. 1) displays a similar microphase-separated morphology and domain size versus the one-pot method (FIG. 2), further validating the success and value of the two-pot procedure.

Example 7: Impact of Two-Pot Synthesis on Particle Incorporation into Multiphase Coatings This example demonstrates the impact of the modular (two-pot) synthesis on particle incorporation. Slightly modified versions of Example 1 and Example 2 coatings are prepared, substituting PEG ($M_n$=3400 g/mol) for PTMO, similar to Examples 4 and 5 as well. About 30 wt % silicon dioxide ($SiO_2$) particles are added to each polymer. In the one-pot reaction, the particles are added into the bulk polymer after both PEG and E10-H fluoropolymer have reacted. In the two-pot reaction, the particles are added to the E10-H fluoropolymer portion an hour into the reaction.

Figure 3:
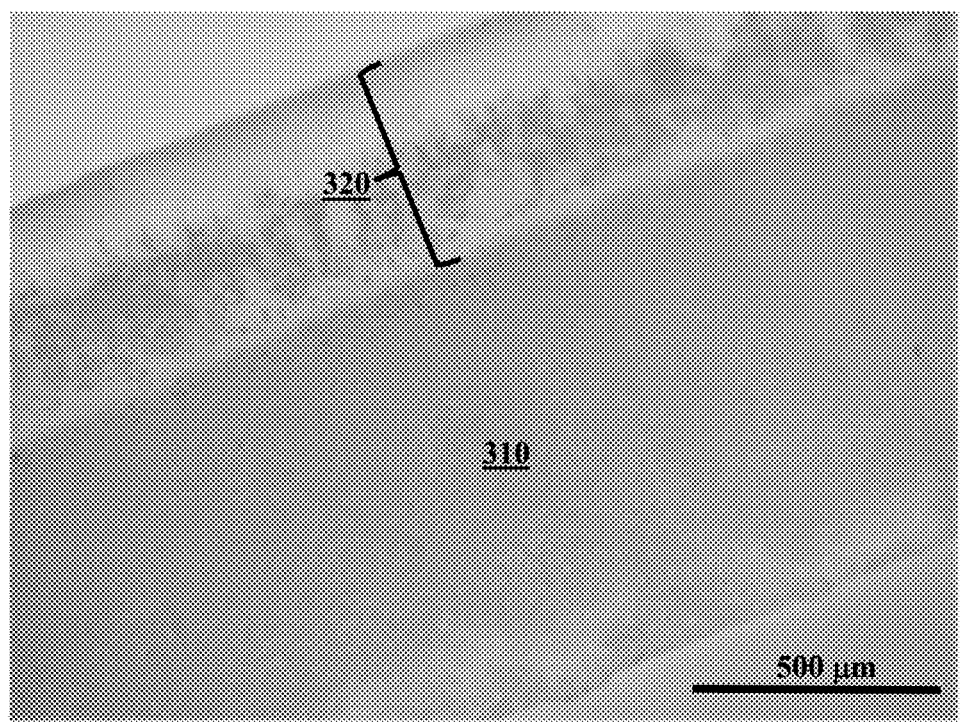
FIG. 3 is a photomicrograph of a film produced from one-pot synthesis, in Example 7.
Figure 3:
Figure 4:
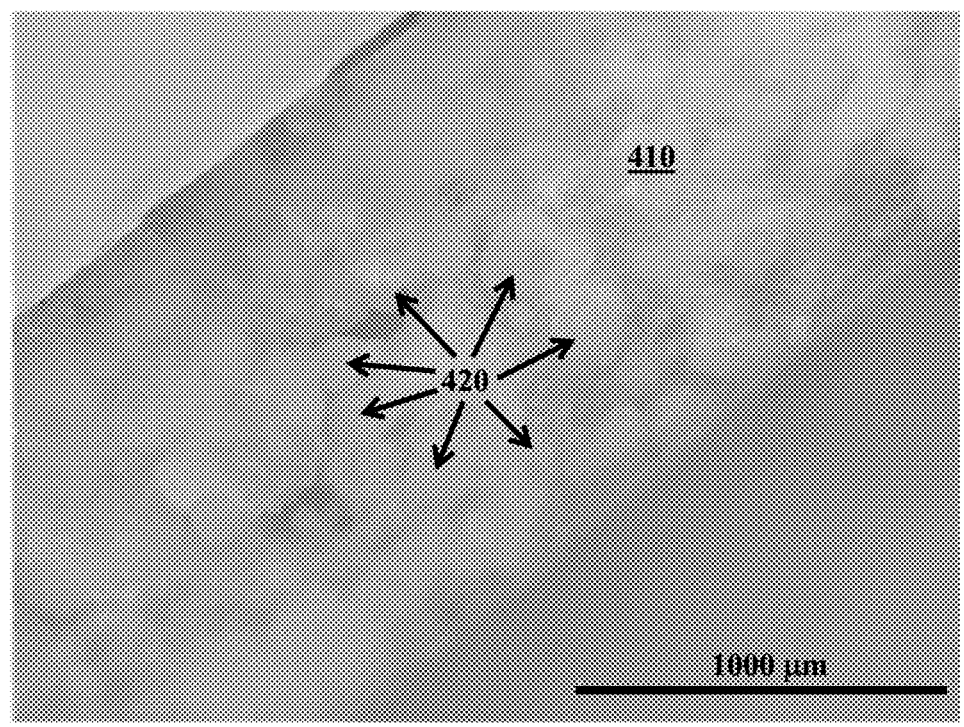
FIG. 4 is a photomicrograph of a film produced from two-pot synthesis, in Example 7.
Figure 4:

The resulting cured films are cross-sectioned and examined using an optical microscope. FIG. 3 shows the photomicrograph of the one-pot film 300 (scale bar 500 µm), and FIG. 4 shows the photomicrograph of the two-pot film 400 (scale bar 1000 µm). These images show a significant difference in the $SiO_2$ particle distribution throughout the two films 300 and 400. In FIG. 3, the $SiO_2$ particles have physically settled into a film 320, when added to the bulk polymer 310. By contrast, in FIG. 4, the $SiO_2$ particles 420 are dispersed throughout the entirety of the film 410, when added selectively to the fluoropolymer portion of the two-pot method. The particle distribution that is observed as a result of the two-pot method suggests the $SiO_2$ particles 420 are indeed segregated into the fluoropolymer domain and unable to agglomerate and settle out into a layer 320, as observed from the one-pot reaction.

Example 8: Anti-Corrosion Properties of Ti-Based Inhibitors

A set of corrosion inhibitors, ammonium hexafluorotitanate (AHFT) and boric acid (BA), when combined in water, undergo a liquid-phase deposition of $TiO_2$ (and possibly other phases). Deki et al., "Titanium (IV) Oxide Thin Films Prepared from Aqueous Solution", *Chem. Lett.* 1996, 25, 433-434, is hereby incorporated by reference in this example. Titanium dioxide, $TiO_2$, is known to be an excellent passivation coating that is resistant to corrosion, and is especially resistant to chloride attack, on a variety of metal surfaces.

An aqueous Ti-containing coating bath (approximately 10 mL in volume) is prepared, consisting of 0.1 M $(NH_4)_2TiF_6$, 0.15 M $H_3BO_3$, and 0.1 M NaCl. The AHFT and BA are predissolved in water before combining and mixing briefly for about 30 seconds. An aluminum alloy 2024-T3 rod (0.25-inch diameter) is prepared as the coating substrate. The aluminum rod is encased in epoxy around the sides, with the bare aluminum metal exposed only on the face of the rod. Once the solution is mixed, the aluminum rod is inserted into the Ti-containing coating bath, and suspended about 5 mm above the bottom, at room temperature. The aluminum rod is exposed to the aqueous Ti-containing coating bath for about 16 hours, resulting in deposition of a $TiO_2$ coating on the aluminum rod surface. The $TiO_2$-coated aluminum rod is then removed, rinsed with deionized water, and left to dry in air at room temperature for about 10 minutes.

Figure 5:
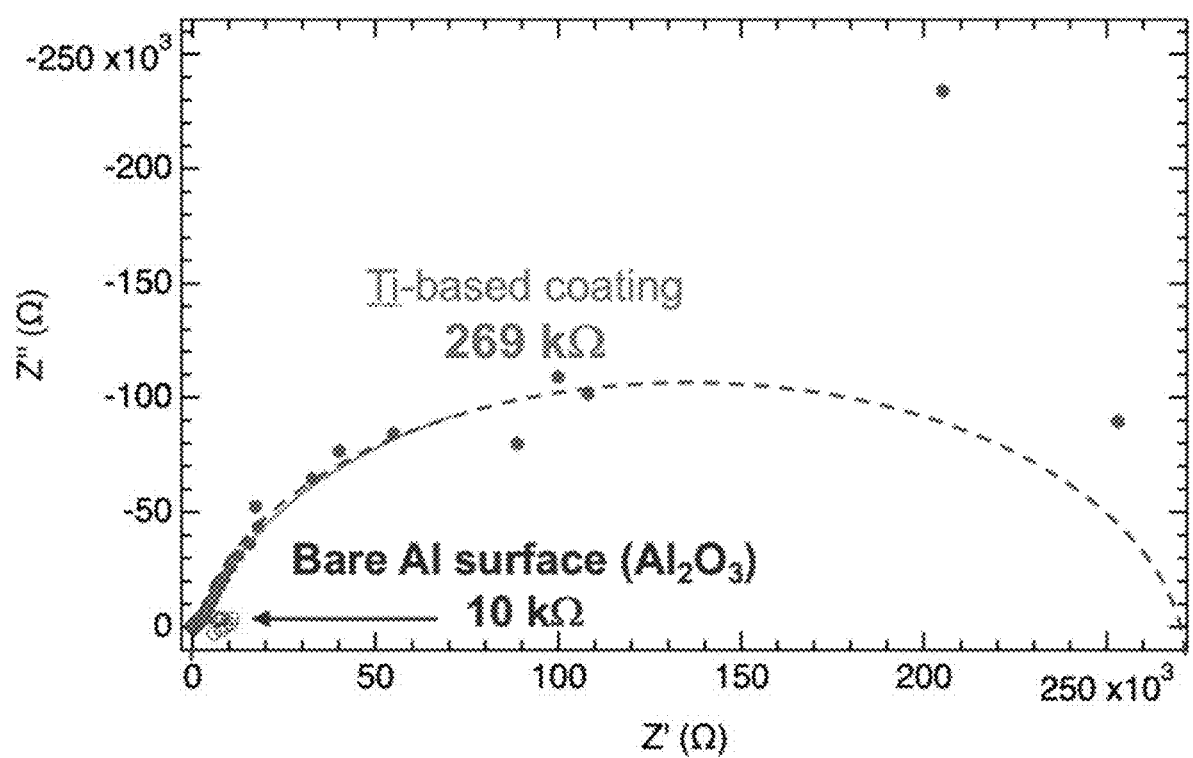
FIG. 5 is a graph of electrochemical impedance spectra from an uncoated and $TiO_2$-coated surface of 2024 Al, in Example 8.

Electrochemical impedance spectroscopy (EIS) measurements are performed on the $TiO_2$-coated aluminum rod surface in a 0.1 M NaCl electrolyte solution containing a borate buffer. A control measure is made on a bare (uncoated) aluminum rod surface. FIG. 5 is a graph of electrochemical impedance spectra from an uncoated and $TiO_2$-coated surface of 2024 Al (coated area approximately 0.3 $cm^2$). The real (Z') and imaginary (Z") components of the impedance are measured over a frequency range from $10^6$ Hz to 0.1 Hz. The extrinsic resistance is determined by extrapolating the semicircle and taking the value of Z' at Z"=0. According to FIG. 5, the $TiO_2$-coated surface exhibits a corrosion resistance of about 269 kΩ, which is nearly 27× greater than the resistance of the uncoated surface (about 10 kΩ).

Example 9: Anti-Corrosion Properties of Multiphase Polymers with Incorporated Corrosion Inhibitors In this example, the corrosion inhibitors ammonium hexafluorotitanate (AHFT) and boric acid (BA) are incorporated into multiphase polymers in order to test their effectiveness in a self-healing coating. Panels of aluminum alloy 2024-T3 are prepared with the multiphase modular hydrophilic coating incorporated with corrosion inhibitors (AHFT and BA), as described in Example 5, and compared to a multiphase modular hydrophilic coating without corrosion inhibitors.

Figure 6A:
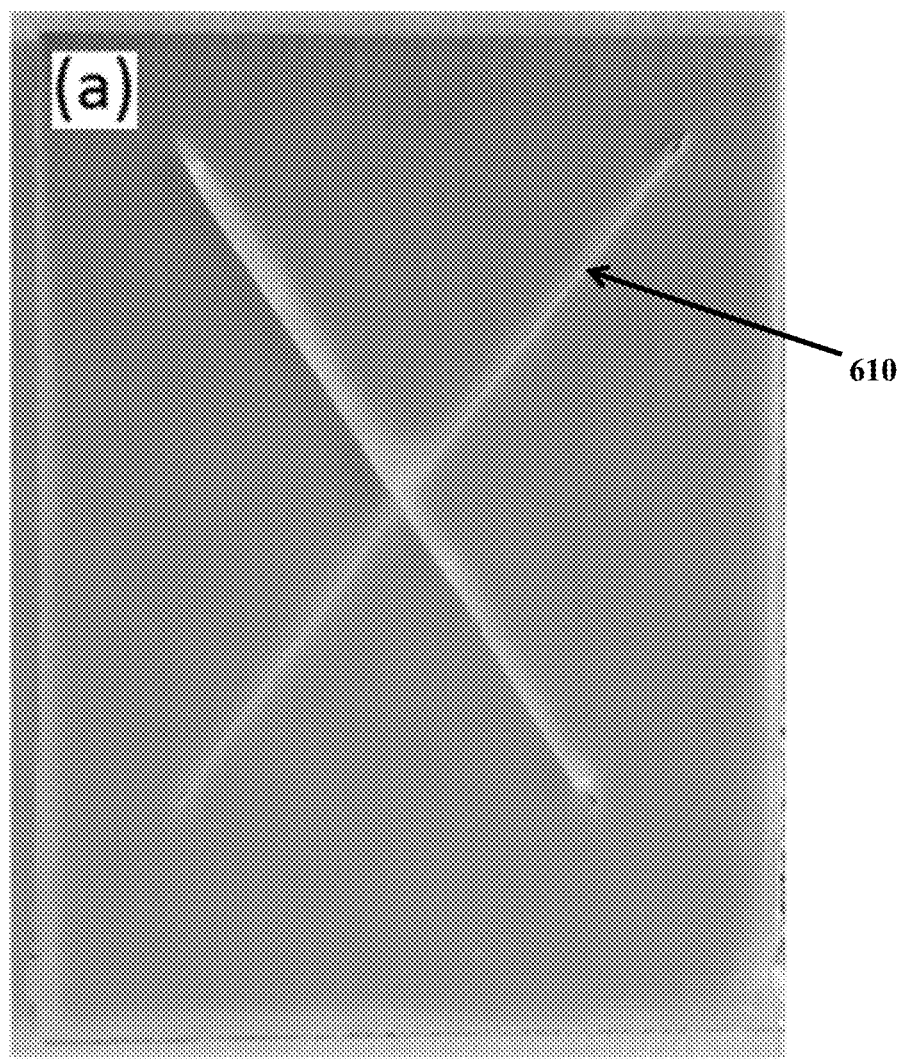
FIG. 6(a) is an optical micrograph of an aluminum panel coated with a multiphase modular hydrophilic coating with corrosion inhibitors, before salt spray tests, in Example 9.
Figure 6B:
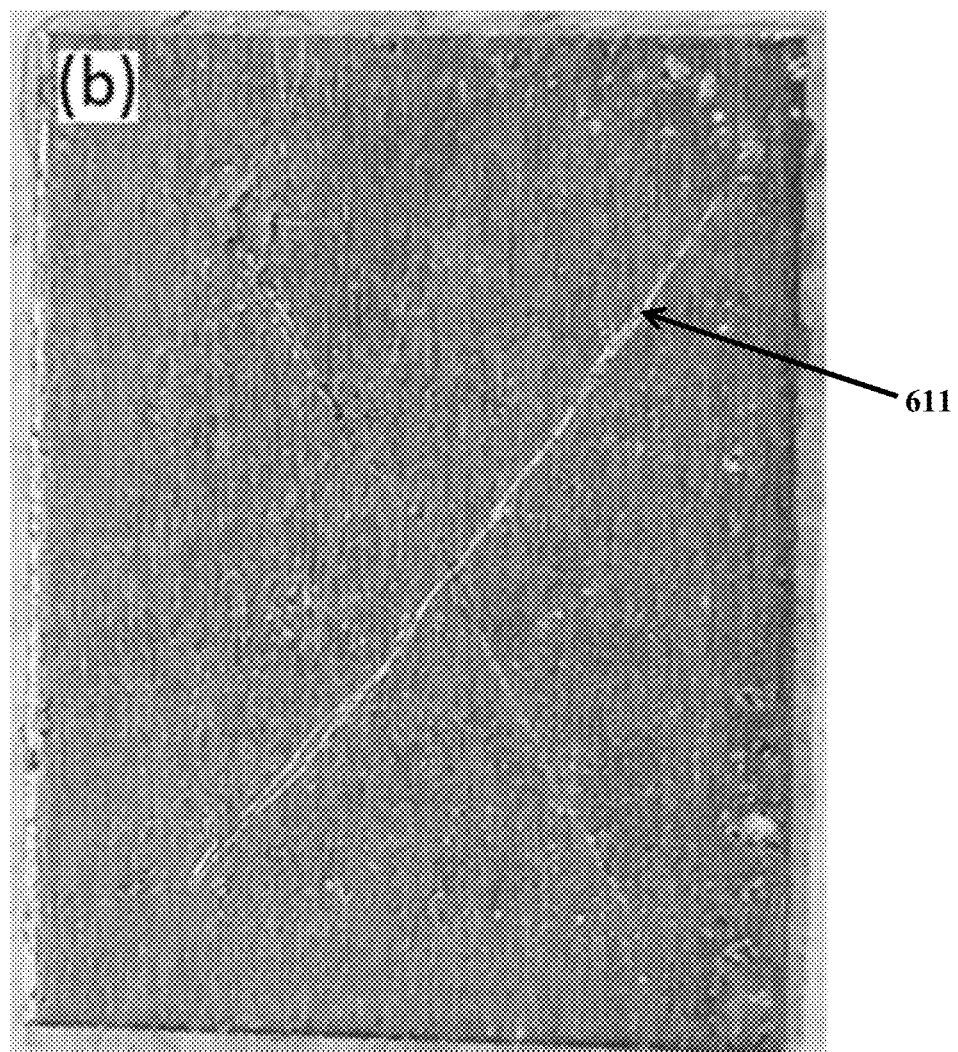
FIG. 6(b) is an optical micrograph of the aluminum panel coated with the multiphase modular hydrophilic coating that includes corrosion inhibitors, following 500 hours of a salt spray (1 M NaCl), in Example 9.
Figure 6C:
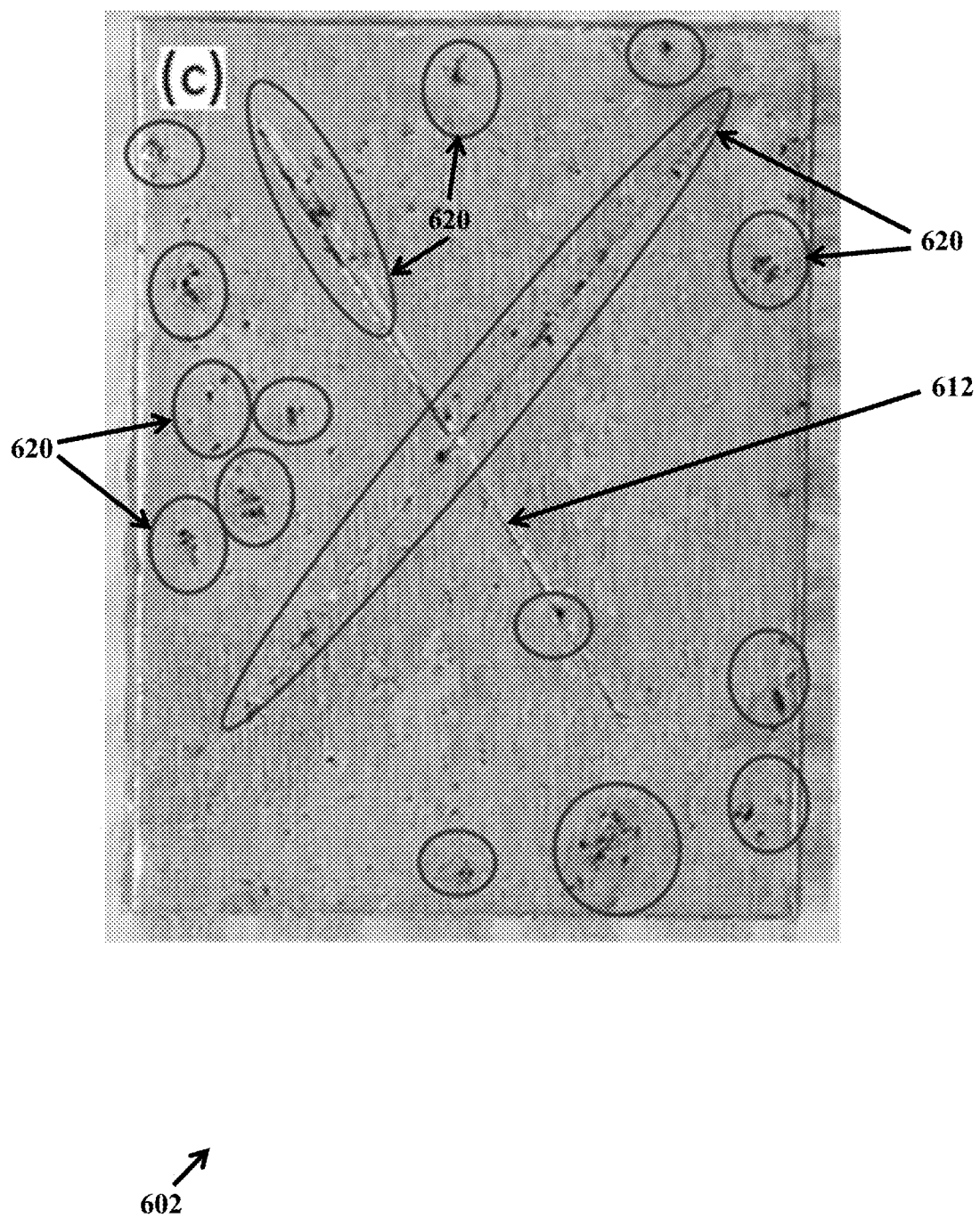
FIG. 6(c) is an optical micrograph of the aluminum panel coated with the multiphase modular hydrophilic coating that does not include corrosion inhibitors, following 500 hours of a salt spray (1 M NaCl), in Example 9.

FIGS. 6(a), 6(b), and 6(c) show coated panels 600, 601, and 602, respectively. These coated panels are each scribed with an "X" pattern 610, 611, and 612, respectively, to simulate a breach in the coating. Coated panels, with and without the Ti-based inhibitors (AHFT and BA), are loaded into a salt spray chamber (using 1 M NaCl) and exposed to about 500 hours of saltwater mist, resulting in panels 601 and 602 in FIGS. 6(b) and 6(c), respectively. After completion, the polymer coating is removed from the aluminum surface and the exposed aluminum is rinsed in deionized water to remove the residual salt.

FIG. 6(a) shows an optical micrograph of the aluminum panel 600 coated with the multiphase modular hydrophilic coating incorporated with corrosion inhibitors (AHFT and BA), before salt spray tests. FIG. 6(b) shows an optical micrograph of the aluminum panel 601 coated with the multiphase modular hydrophilic coating that includes the corrosion inhibitors, following 500 hours of a salt spray (1 M NaCl). Minimal effects of corrosion are observed in FIG. 6(b). FIG. 6(c) shows an optical micrograph of the aluminum panel 602 coated with the multiphase modular hydrophilic coating that does not include the corrosion inhibitors, following 500 hours of a salt spray (1 M NaCl). Without the corrosion inhibitors, the aluminum panel 602 shows a number of dark regions 620, circled in FIG. 6(c), indicative of corrosion.

Also, scanning electron microscopy and energy dispersive spectroscopy of the aluminum surfaces reveal the presence of Ti and F on the surface of the panel coated with the polymer containing the inhibitors. These results, along with the above results from the salt spray tests in this example, are a strong indication that in a corrosive environment (e.g., in the presence of an aqueous electrolyte), the inhibitors are released and react to passivate the surface and protect it from corrosion.

The coatings disclosed herein may be applied to various structures including, but not limited to, wind turbine blades, automobiles, trucks, trains, ocean-going vessels, electrical power transmission lines, buildings, antennas, chemical plant infrastructure (e.g., distillation columns and heat exchangers), and so on. Other practical applications for the present invention include, but are not limited to, vehicle windows, filters, instruments, sensors, cameras, satellites, and weapon systems.

In this detailed description, reference has been made to multiple embodiments and to the accompanying drawings in which are shown by way of illustration specific exemplary embodiments of the invention. These embodiments are described in sufficient detail to enable those skilled in the art to practice the invention, and it is to be understood that modifications to the various disclosed embodiments may be made by a skilled artisan.

Where methods and steps described above indicate certain events occurring in certain order, those of ordinary skill in the art will recognize that the ordering of certain steps may be modified and that such modifications are in accordance with the variations of the invention. Additionally, certain steps may be performed concurrently in a parallel process when possible, as well as performed sequentially.

All publications, patents, and patent applications cited in this specification are herein incorporated by reference in their entirety as if each publication, patent, or patent application were specifically and individually put forth herein.

The embodiments, variations, and figures described above should provide an indication of the utility and versatility of the present invention. Other embodiments that do not provide all of the features and advantages set forth herein may also be utilized, without departing from the spirit and scope of the present invention. Such modifications and variations are considered to be within the scope of the invention defined by the claims.

What is claimed is:

1. A multiphase polymer composition comprising a first polymer material and a second polymer material that are chemically distinct, wherein said first polymer material and said second polymer material are microphase-separated on a microphase-separation length scale from 0.1 microns to 500 microns, wherein said multiphase polymer composition comprises first solid functional particles selectively dispersed within said first polymer material, and wherein said first solid functional particles are chemically distinct from said first polymer material and said second polymer material.

2. The multiphase polymer composition of claim 1, wherein said first solid functional particles are capable of reacting with said second polymer material, in response to an environmental input selected from the group consisting of ultraviolet light, change in temperature, change in pressure, environmental solvents, change in humidity, change in pH, and combinations thereof.

3. The multiphase polymer composition of claim 1, wherein said multiphase polymer composition is disposed on a surface, and wherein said first solid functional particles are capable of reacting with said surface, in response to an environmental input selected from the group consisting of ultraviolet light, change in temperature, change in pressure, environmental solvents, change in humidity, change in pH, and combinations thereof.

4. The multiphase polymer composition of claim 1, wherein said first solid functional particles are dissolvable in water or an aqueous solvent.

5. The multiphase polymer composition of claim 1, wherein said first solid functional particles are dissolvable in an organic solvent.

6. The multiphase polymer composition of claim 1, wherein said multiphase polymer composition further comprises second solid functional particles selectively dispersed within said second polymer material, and wherein said second solid functional particles are chemically distinct from said first polymer material and said second polymer material.

7. The multiphase polymer composition of claim 1, wherein said multiphase polymer composition is disposed on a surface, and wherein said second solid functional particles are capable of reacting with said surface, in response to an environmental input selected from the group consisting of ultraviolet light, change in temperature, change in pressure, environmental solvents, change in humidity, change in pH, and combinations thereof.

8. The multiphase polymer composition of claim 1, wherein said first solid functional particles include inorganic particles, organic particles, or a combination thereof.

9. The multiphase polymer composition of claim 1, wherein said first solid functional particles include oxidizing agents, reducing agents, or a combination thereof.

10. The multiphase polymer composition of claim 1, wherein said first solid functional particles are selected from the group consisting of metals, metal oxides, organic oxides, ceramics, salts, polymers, and combinations thereof.

11. The multiphase polymer composition of claim 1, wherein said first solid functional particles are surface-treated to enhance chemical compatibility with said first polymer material.

12. The multiphase polymer composition of claim 1, wherein said first solid functional particles have an average particle size from 50 nanometers to 500 microns.

13. The multiphase polymer composition of claim 1, wherein said first polymer material and said second polymer material are independently selected from the group consisting of polyesters, polyethers, polyacrylates, polymethacrylates, polyepoxides, polysiloxanes, cellulosic polymers, and combinations thereof.

14. The multiphase polymer composition of claim 1, wherein one of said first polymer material or said second polymer material is a continuous matrix, and the other of said first polymer material or said second polymer material is a plurality of inclusions, dispersed within said continuous matrix.

15. The multiphase polymer composition of claim 1, wherein said multiphase polymer composition contains a segmented block copolymer, wherein said first polymer material contains first soft segments of said segmented block copolymer, and wherein said second polymer material contains second soft segments of said segmented block copolymer.

16. The multiphase polymer composition of claim 15, wherein said segmented copolymer composition comprises:
    (a) one or more said first soft segments selected from fluoropolymers having an average molecular weight from 500 g/mol to 10,000 g/mol, wherein said fluoropolymers are ($\alpha,\omega$)-hydroxyl-terminated and/or ($\alpha,\omega$)-amine-terminated;
    (b) one or more said second soft segments selected from polyesters or polyethers, wherein said polyesters or polyethers are ($\alpha,\omega$)-hydroxyl-terminated and/or ($\alpha,\omega$)-amine-terminated, wherein the molar ratio of said second soft segments to said first soft segments is optionally less than 2.0;
    (c) one or more isocyanate species, or a reacted form thereof, possessing an isocyanate functionality of 2 or greater; and
    (d) one or more polyol or polyamine chain extenders or crosslinkers, or a reacted form thereof.

17. The multiphase polymer composition of claim 15, wherein said segmented block copolymer has the structure:

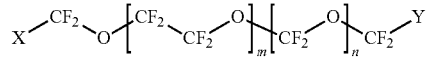

wherein:
X, Y=$CH_2$—(O—$CH_2$—$CH_2$)$_p$-T, and X and Y are independently selected;
p=1 to 50;
T is a hydroxyl or amine terminal group;
m=1 to 100; and
n=0 to 100.

18. The multiphase polymer composition of claim 1, wherein said multiphase polymer composition is present in or as a coating.

* * * * *